United States Patent
Kitamura et al.

(10) Patent No.: US 8,147,337 B2
(45) Date of Patent: Apr. 3, 2012

(54) GAME SYSTEM

(75) Inventors: Noriko Kitamura, Kyoto (JP); Shinji Kitahara, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 1506 days.

(21) Appl. No.: 11/640,326

(22) Filed: Dec. 18, 2006

(65) Prior Publication Data

US 2008/0102958 A1  May 1, 2008

(30) Foreign Application Priority Data

Nov. 1, 2006 (JP) ................. 2006-298228

(51) Int. Cl.
*A63F 9/24* (2006.01)
*A63F 13/00* (2006.01)
*G06F 17/00* (2006.01)
*G06F 19/00* (2006.01)

(52) U.S. Cl. ............... 463/42; 463/20; 463/25; 463/40; 463/41; 273/143

(58) Field of Classification Search ............. 463/20, 463/25, 40, 41, 42; 273/143
See application file for complete search history.

(56) References Cited

U.S. PATENT DOCUMENTS

| 6,320,110 B1 * | 11/2001 | Ishikawa et al. ............... 84/600 |
| 6,554,711 B1 * | 4/2003 | Kawasaki et al. ............... 463/43 |
| 2002/0025853 A1 * | 2/2002 | Kojima et al. ................. 463/42 |
| 2004/0204226 A1 * | 10/2004 | Foster et al. .................. 463/20 |

FOREIGN PATENT DOCUMENTS

JP 2004-325775 11/2004
* cited by examiner

*Primary Examiner* — David L Lewis
*Assistant Examiner* — Adetokunbo Torimiro
(74) *Attorney, Agent, or Firm* — Nixon & Vanderhye P.C.

(57) ABSTRACT

An ensemble game system for executing an ensemble game comprises a plurality of game apparatuses 10a through 10c communicable to each other. Each of the game apparatuses 10a through 10c outputs a sound of an own part in accordance with a play operation by the player during a first play period, and also transmits play data (rehearsal data) for specifying a play result of the own part during the first play period to the other game apparatuses. Play data for specifying play results of the parts other than the own part is received from the other game apparatuses and stored on a storage device. During a second play period subsequent to the first play period, each of the game apparatuses 10a through 10c outputs the sounds of the other parts using the play data of the other parts stored on the storage device, while outputting a sound of the own part in accordance with a play operation by the player.

21 Claims, 14 Drawing Sheets

GAME SYSTEM

CROSS REFERENCE TO RELATES APPLICATION

The disclosure of Japanese Patent Application No. 2006-298228, filed on Nov. 1, 2006, is incorporated herein by reference.

BACKGROUND OF THE INVENTION

1. Field of the Invention

The present invention relates to a game system, and more specifically to a game system by which a plurality of users each use a game apparatus to play one game.

2. Description of the Background Art

Patent document 1 (Japanese Laid-Open Patent Publication No. 2004-325775) describes a system for ensemble by which a plurality of users can each use a playing device to play ensemble. According to this system, each playing device for playing each part, such as an electronic piano, is connected to an ensemble mixing server via the Internet. Play information representing a play which has been performed on each playing device is once transmitted to the ensemble mixing server. The mixing server mixes the play information transmitted from the playing devices, and transmits the mixed play information to each playing device. Each playing device receives the mixed play information and outputs the mixed play information as a tune. Thus, the plurality of users can play ensemble while each using a terminal (playing device).

The playing devices described in patent document 1 each need to communicate with the ensemble mixing server after a play is performed thereon before the tune is output. Due to the time required for the communication, each playing device cannot output the tune immediately after the play is performed thereon. There is a delay after a play operation is performed until the tune is output. This makes it difficult for the user to perform a play operation and declines the operability.

Other game systems by which a plurality of users each use a game apparatus to play one game also have substantially the same problem. More specifically, with such a game system, a game apparatus of each user can receive data representing operation results of the other game apparatuses and thus can reflect such operation results, but the time required for the communication delays the operation results to be reflected.

SUMMARY OF THE INVENTION

Therefore, an object of the present invention is to provide a novel game system for allowing a plurality of users to play a game via communication without being influenced by delay caused by the communication.

The present invention has the following features to attain the object mentioned above. The reference numerals, additional descriptions and the like in parentheses in this section of the specification indicate the correspondence with the embodiments described later for easier understanding of the present invention, and do not limit the present invention in any way.

A first aspect of the present invention is directed to an ensemble game system, comprising a plurality of game apparatuses (10a through 10c) communicable to each other and allowing players to respectively play a plurality of parts which form a tune using a respective game apparatus to execute an ensemble game. Each of the plurality of game apparatuses includes input means (operation switch section 14 and/or touch panel 25); first play execution means (CPU core 21 or the like for executing step S39; hereinafter, only the corresponding step number(s) will be mentioned in this section); play reproduction data transmission means (S34); play reproduction data receiving means (S35 and S36); and second play execution means (S69). The first play execution means outputs a sound of an own part in accordance with an input on the input means by the player during a first play period. The play reproduction data transmission means generates play reproduction data (rehearsal data) which is play data for reproducing a play of the own part during the first play period based on the input on the input means during the first play period, and transmits the play reproduction data to another game apparatus. The play reproduction data receiving means receives play reproduction data on another part of the tune other than the own part from the another game apparatus and stores the play reproduction data on storage means (RAM 24) of the own game apparatus. The second play execution means for outputs a sound of the another part using the play reproduction data stored on the storage means during a second play period subsequent to the first play period, while outputting a sound of the own part in accordance with an input on the input means by the player during the second play period.

In the first aspect, the expression "input on the input means" is a concept encompassing an operation input performed on the operation switch and an audio input performed on audio input means such as a microphone or the like. The play reproduction data may be anything which can reproduce a content of the play, and is a concept encompassing data representing a history of the operations performed by the player, data on a sound converted from the operation, data representing whether the operation is correct or incorrect with respect to the reference operation, data on a sound based on the correct/incorrect determination result, and data on a sound which is output as a play result.

In the first aspect, the plurality of game apparatuses are typically communicable with each other via a wide area network such as the Internet, but may be communicable via a local network or an ad hoc network according to the present invention. The plurality of game apparatuses may communicate via a server, or directly communication each other. After a group of game apparatuses for performing a communication game via a server is formed, the group of game apparatuses may directly communicate each other.

According to a second aspect of the present invention, the storage means of each game apparatus may have stored thereon tune data (56) for specifying contents of the parts of the tune. In this case, each game apparatus further comprises automatic reproduction means (S39) for automatically outputting the sound of the another part using the tune data during the first play period. The first play execution means outputs the sound of the own part in accordance with an input on the input means by the player in concert with the sound of the another part reproduced by the automatic reproduction means.

According to a third aspect of the present invention, at least one of the plurality of game apparatuses further may comprise tune data storage means (RAM 24), tune determination means (S11) and tune data transmission means (S18). The tune data storage means is capable of storing a plurality of pieces of tune data, each for specifying contents of the parts forming a tune. The tune determination means determines a tune to be played among the tunes, the tune data of which is stored on the tune data storage means. The tune data transmission means transmits the tune data of the tune determined by the tune determination means to the another game apparatus. The remaining of the plurality of game apparatuses other than the at least one game apparatus (the game apparatus other than the game apparatus for transmitting the tune data of the tune determined by the tune determination means to the other game apparatus) receives the tune data transmitted from the tune data transmission means and executes the ensemble game using the tune data.

In the third aspect, the tune data may include data for specifying the contents of the parts of the tune, and also data for generating an instruction image to be displayed on a screen of the game apparatus during the play period in which the tune is to be played, or data on background music to be reproduced during the play of the tune.

In the third aspect, the game apparatus may further determine whether or not the other game apparatus have stored thereon the tune data of the tune determined by the tune determination means, and transmit the tune data only to the game apparatus which does not have such tune data. Each game apparatus may further comprise tune data creation means for creating tune data based on an input by the player, and may store the tune data created by the tune data creation means on the tune data storage means. The ensemble game system may further comprise a server which has stored thereon a plurality of pieces of tune data, and each game apparatus may receive the tune data distributed from the server and store the distributed tune data on the tune data storage means.

According to a fourth aspect of the present invention, the ensemble game system may further comprise group determination means (server 1) for determining a group of game apparatuses to join the ensemble game among a plurality of game apparatuses executing the ensemble game.

According to a fifth aspect of the present invention, each game apparatus may further comprise instruction data storage means (RAM 24) and instruction means (S40 and S70). The instruction data storage means stores instruction data for instructing an input on the input means for each part. The instruction means instructs an input based on the instruction data on the own part.

According to a sixth aspect of the present invention, each game apparatus may further comprise corresponding sound data storage means (RAM 24) for storing, for each part, corresponding sound data which is output in correspondence with an input on the input means. In this case, the first play execution means and the second play execution means refer to the corresponding sound data to output the sound of the own part in accordance with the input on the input means.

According to a seventh aspect of the present invention, the ensemble game system may comprise group determination means (server 1) for determining a group of game apparatuses to join the ensemble game among a plurality of game apparatuses. In this case, the following processing is executed in each of the game apparatuses included in the group determined by the group determination means. The first play execution means outputs the sound of the own part in accordance with an input on the input means by the player. The play reproduction data transmission means transmits the play reproduction data which is play data for reproducing the play of the own part during the first play period to another game apparatus in the group. The play reproduction data receiving means receives play reproduction data on another part other than the own part from the another game apparatus included in the group, and stores the play reproduction data on the storage means of the own game apparatus. The second play execution means outputs a sound of the another part using the play reproduction data on the another game apparatus in the group, the data being the stored on the storage means, during the second play period subsequent to the first play period, while outputting the sound of the own part in accordance with an input on the input means by the player during the second play period.

According to an eighth aspect of the present invention, the ensemble game system may further comprise part determination means (S26). The part determination means determines a part for each game apparatus. In this case, the first play execution means outputs a sound of the part of the own game apparatus determined by the part determination means in accordance with an input on the input means. The second play execution means outputs the sound of the part of the own game apparatus determined by the part determination means in accordance with the input on the input means, while outputting a sound of a part of the another game apparatus determined by the part determination means using the play reproduction data on the another game apparatus.

In the eighth aspect, the part determination means may be realized by each game apparatus having means for determining an own part. In this case, after the game apparatuses exchange the respective hopes via communication, the part assigned to each game apparatus may be determined. One game apparatus or a server other than the game apparatuses may have means for determining the part assigned to each game apparatus. In this case, the correspondence between each game apparatus and the part assigned thereto determined by the part determination means is notified to each game apparatus.

According to a ninth aspect of the present invention, each game apparatus may further comprise first timing determination means (S31) for synchronizing a timing to start the first play period among the game apparatuses.

According to a tenth aspect of the present invention, the play reproduction data transmission means may sequentially transmit play reproduction data of the own part during the first play period. In this case, the play reproduction data receiving means sequentially receives the play reproduction data of the another part from the another game apparatus.

According to an eleventh aspect of the present invention, each game apparatus may further comprise own play reproduction data storage control means for causing the storage means to sequentially store the play reproduction data of the own part. In this case, after the first play period is finished, the play reproduction data transmission means transmits the play reproduction data of the own part stored on the storage means to the another game apparatus.

According to a twelfth aspect of the present invention, the play reproduction data may include data (frame number data) representing a time point in the first or the second play period and operation data representing a play operation made by the player at the time point.

According to a thirteenth aspect of the present invention, each game apparatus may further comprise play result data transmission means (S64), play result data receiving means (S65), and evaluation means (S76). The play result data transmission means transmits play result data for specifying a play result of the own part during the second play period to another game apparatus. The play result data receiving means receives play result data for specifying a play result of the another part during the second play period from the another game apparatus. The evaluation means evaluates a play result of the entirety of the plurality of parts based on the play result data for specifying the play result of the own part during the second play period and the play result data received by the play result data receiving means.

In the thirteenth aspect, the play result data is a concept encompassing play data for specifying a play content and data representing an evaluation result (specifically, score) on the play content.

According to a fourteenth aspect of the present invention, each game apparatus may further comprise second timing determination means (S61) for synchronizing a timing to start the second play period among the game apparatuses.

According to a fifteenth aspect of the present invention, the storage means of each game apparatus may have stored thereon tune data for specifying contents of the parts of the tune. In this case, each game apparatus further comprises generation determination means (S82) for determining, during the second play period, whether it is possible to generate a sound of the another part for each of portions of the tune using the play reproduction data of the another part stored on the storage means. Regarding the part on which the determination result of the generation determination means is negative, the second play execution means generates, using the tune data, a sound of the portion of the tune, which is determined as not being able to be generated using the play reproduction data of the another part.

A sixteenth aspect of the present invention is directed to an ensemble game system, comprising a plurality of game apparatuses communicable to each other, the game system allowing players to respectively play a plurality of parts which form a tune using a respective game apparatus to execute an ensemble game. The game system comprises group determination means and part determination means. The group determination means determines a group of game apparatuses to join the ensemble game among a plurality of game apparatuses. The part determination means determines a part of each game apparatus included in the group determined by the group determination means, prior to start of the ensemble game. Each game apparatus included in the group determined by the group determination means comprises first play execution means; automatic reproduction means; play reproduction data transmission means; play reproduction data receiving means; reproduction means; and second play execution means. The first play execution means instructs the player on an input of an own part determined by the part determination means, while outputting a sound in accordance with an input on input means by the player, during a first play period of the ensemble game. The automatic reproduction means automatically outputs a sound of a part other than the part determined by the part determination means during the first play period of the ensemble game. The play reproduction data transmission means generates play reproduction data which is data for reproducing a sound output executed by the first play execution means of the own game apparatus during the first play period, based on an input on the input means during the first play period, and transmits the play reproduction data to another game apparatus included in the group. The play reproduction data receiving means receives play reproduction data from the another game apparatus included in the group and stores the play reproduction data on storage means of the own game apparatus. The reproduction means, during a second play period in the ensemble game subsequent to the first play period, reproduces a sound output executed by the first play execution means of the another game apparatus included in the group during the first play period, using the play reproduction data of the another game apparatus, the data being stored on the storage means. The second play execution means instructs the player on an input of the own part determined by the part determination means, while outputting a sound in accordance with an input on the input means by the player in concert with the sound output by the reproduction means, during the second play period of the ensemble game.

In the sixteenth aspect, each game apparatus may store instruction data for instructing sequential input from the start to the end of the tune for each part. In this case, during the first play period, each game apparatus may make an instruction by the instruction data on the own part determined by the part determination means. The instruction data may be stored in advance in each game apparatus, may be obtained by distribution via a network or the like, or obtained from another game apparatus.

The play reproduction transmission means may sequentially transmit the play reproduction data during the first play period, or transmit all the play reproduction data after the first play period is finished. The play reproduction data may be directly transferred between the game apparatuses or via a server.

A seventeenth aspect of the present invention is directed to an ensemble game system, comprising a plurality of game apparatuses communicable to each other and allowing players to play a tune using the plurality of game apparatuses to execute an ensemble game. Each of the plurality of game apparatuses includes input means; first play execution means; play reproduction data transmission means; play reproduction data receiving means; and second play execution means. The first play execution means outputs a sound of an own play in accordance with an input on the input means by the player during a first play period. The play reproduction data transmission means generates play reproduction data which is play data for reproducing the own play during the first play period based on the input on the input means during the first play period, and transmits the play reproduction data to another game apparatus. The play reproduction data receiving means receives play reproduction data transmitted from the another game apparatus and stores the play reproduction data on storage means of the own game apparatus. The second play execution means outputs a sound of a play of the another game apparatus using the play reproduction data stored on the storage medium during a second play period subsequent to the first play period, while outputting a sound of the own play in accordance with an input on the input means by the player during the second play period.

The present invention may be provided in the form of a game apparatus (10) included in the game system. The present invention may be provided in the form of a storage medium (memory card 17) having stored thereon a game program (51) executable by a computer (CPU core 21 or the like) of the game apparatus.

According to the first aspect, two play periods are provided. The play reproduction data of the other game apparatus during the first play period is used during the second play period so as to output the sound of the other part. Namely, the play reproduction data of the other game apparatus during the first play period is received from the other game apparatus and stored before the second play period at the latest. During the second play period, the stored play reproduction data is used to output the sound of the other part. Thus, during the second play period, the play reproduction data of the play result of the first play which is already stored is used. Therefore, the timing of the own part and the timing of the other part can be easily matched to each other. According to the first aspect, the poorness of the operability caused by the delay in communication can be alleviated.

According to the second aspect, the sound of the other part is output even during the first play period. Therefore, the player can feel as if playing ensemble with the other players even during the first play. In addition, the player can practice coordinating the sound of the own part to the sounds of the other parts during the first play, and thus can be ready for the second play.

According to the third aspect, even at least one of a plurality of game apparatuses included in the game system does not have tune data of the tune to be played, the tune data is transmitted to such a game apparatus. Thus, such a game apparatus can perform the ensemble game.

According to the fourth aspect, the game apparatuses to join the ensemble game can be automatically selected to form a group to play the ensemble game.

According to the fifth aspect, the game apparatus notifies the play content of the own part to the player. Thus, the player can be encouraged to play the own part, and a correct play content can be presented to the player.

According to the sixth aspect, the sound of each part can be easily output by using the corresponding sound data. Since the corresponding sound data includes the sound data of each part, the game apparatus can appropriately output the sound of the own part whichever part is assigned thereto.

According to the seventh aspect, a group of game apparatuses to perform the ensemble game is determined among a plurality of game apparatuses. Therefore, the opponent is not always the same, and the player can play the game with different opponents.

According to the eighth aspect, the player of each game apparatus can select the part of the tune that he/she wishes to play.

According to the ninth aspect, since the starting timing of the first play period is substantially the same among the game apparatuses, the finishing timing of the first play period is also substantially the same among the game apparatuses. Therefore, the players can start the second play soon after the first play period is finished without waiting for a long time.

According to the tenth aspect, the play reproduction data is transmitted during the first play period, so that the second play period can be started within a short time after the first play period is finished.

According to the eleventh aspect, all the play reproduction data is transmitted after the first play period is finished, so that the number of times of communication during the game can be reduced.

According to the twelfth aspect, the play content is specified based on the operation data indicating the play operation performed by the player. As compared to the case where the play content is specified based on the play sound, the amount of data required for the play reproduction can be reduced.

According to the thirteenth aspect, the player can obtain an evaluation the entire play of each part by each player. Thus, the play is evaluated in consideration of the other players' performances as well as his/her own performance. It becomes more entertaining to play with the other players than playing alone.

According to the fourteen aspect, since the starting timing of the second play period is substantially the same among the game apparatuses, the finishing timing of the second play period is also substantially the same among the game apparatuses. Therefore, the players can obtain the evaluation on the ensemble without waiting for a long time after the second play period is finished.

According to the fifteenth aspect, even when play reproduction data is not received from any of the game apparatuses due to the problem regarding communication, the sound of that part can be generated and output.

According to the sixteenth aspect, as in the first aspect, during the second play period, the play reproduction data of the play result of the first play which is already stored is used.

Therefore, the timing of the own part and the timing of the other part can be easily matched to each other. According to the sixteenth aspect also, the poorness of the operability caused by the delay in communication can be alleviated.

According to the seventeenth aspect, two play periods are provided. The play reproduction data of the other game apparatus during the first play period is used during the second play period so as to output the sound of the other part. During the second play period, the stored play reproduction data is used to output the play sound of other game apparatus. Thus, during the second play period, the play reproduction data of the play result of the first play which is already stored is used. Therefore, the timing of the own part and the timing of the other part can be easily matched to each other. According to the seventeenth aspect also, the poorness of the operability caused by the delay in communication can be alleviated.

These and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
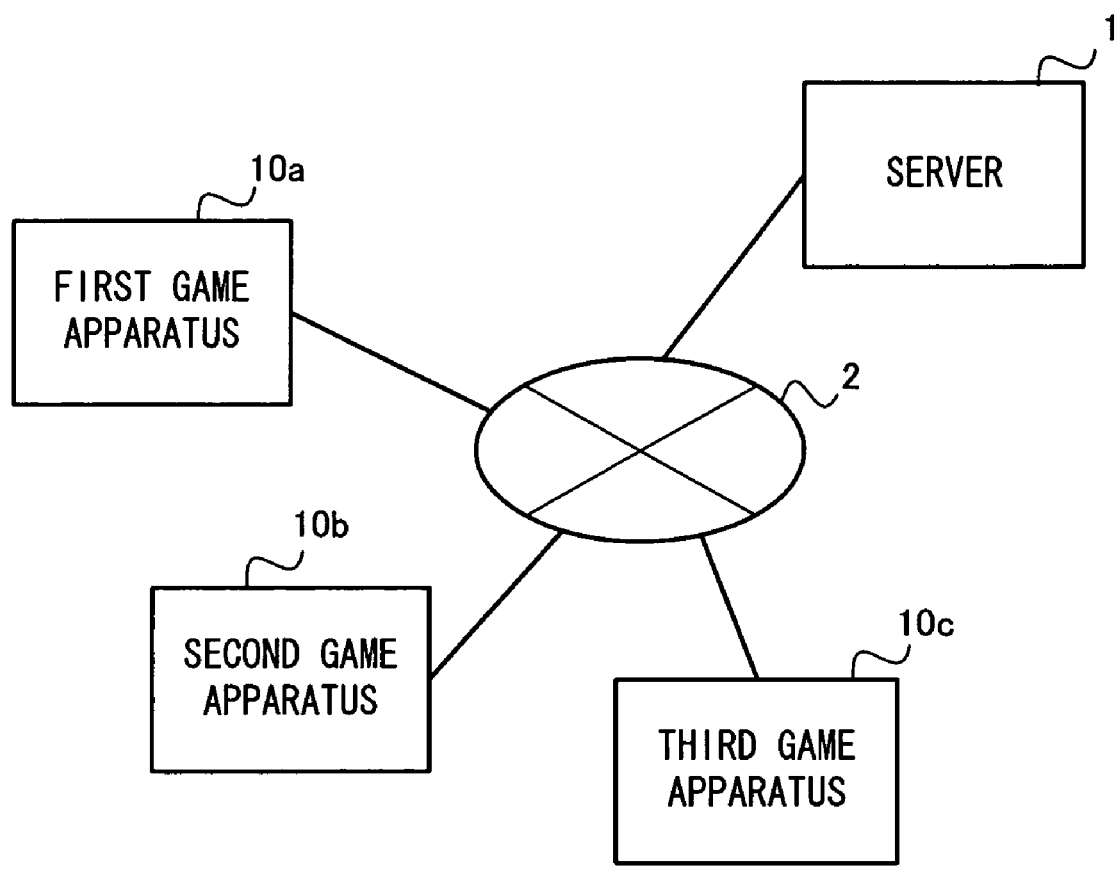
FIG. 1 is a block diagram showing a structure of a game system according to an embodiment of the present invention.

Hereinafter, a game system, a game apparatus and a game program according to one embodiment of the present invention will be described. FIG. 1 is a block diagram showing a structure of the game system according to this embodiment. As shown in FIG. 1, the game system includes a server 1 and a plurality of mobile game apparatuses (hereinafter, referred to simply as "game apparatuses") 10a through 10c connected to each other via a network 2 such as the Internet or the like. In this embodiment, the game system includes three game apparatuses 10a through 10c, and FIG. 1 shows a case where three players each use one game apparatus to perform a game. The game system may include any number of game apparatuses which is at least two. The game apparatuses 10a through 10c are wirelessly connectable to the network 2, but may be connected in a wired manner. Each game apparatus may be an installation type game apparatus instead of a mobile game apparatus. For example, a mobile game apparatus may be connected to an installation type game apparatus, which is connected to the network 2. In this case, a plurality of mobile game apparatuses may be connected to the installation type game apparatus. In the description below, one game apparatus may be referred to simply as the "game apparatus 10" when it is not necessary to specify which game apparatus it is.

The server 1 is an apparatus for executing determination of a group of game apparatuses to perform a communication game (matching). In another embodiment, the game system may not include the server 1. The operation of the server 1 will be described later in detail.

(Structure of the Game Apparatus)

Figure 2:
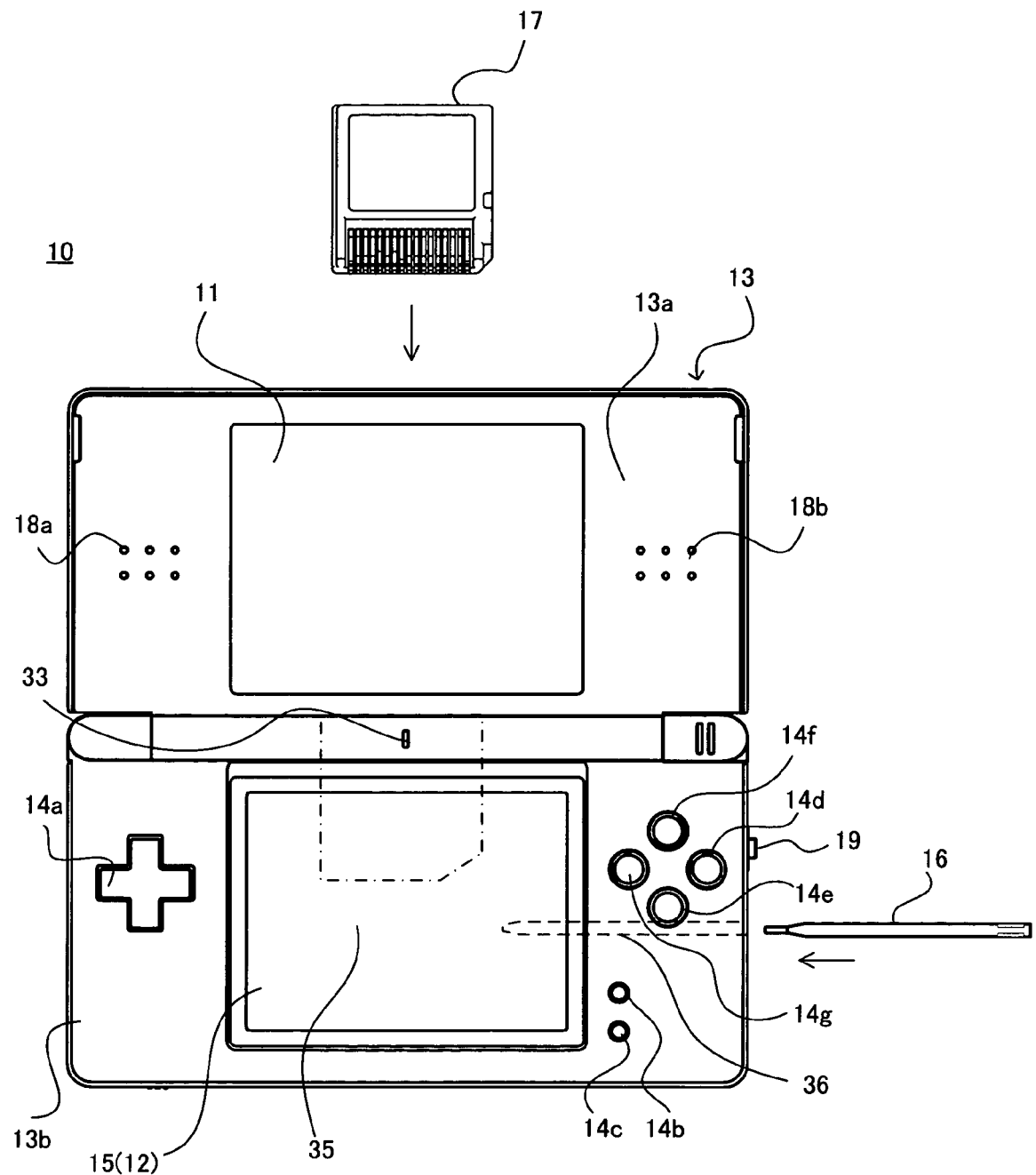
FIG. 2 is an external view of a game apparatus 10 included in the game system.

First, a structure of the game apparatus 10 will be described. FIG. 2 is an external view of the game apparatus 10 included in the game system 1. In this embodiment, the game apparatuses included in the game system all have the same structure shown in FIG. 1.

As shown in FIG. 2, the game apparatus 10 includes a first LCD (Liquid Crystal Display) 11 and a second LCD 12. A housing 13 includes an upper housing 13a and a lower housing 13b. The first LCD 11 is accommodated in the upper housing 13a, and the second LCD 12 is accommodated in the lower housing 13b. The first LCD 11 and the second LCD 12 both have a resolution of 256 dots×192 dots. In this embodiment, LCDs are used as display devices, but alternatively, other arbitrary display devices such as EL (Electro Luminescence) devices or the like are usable. The display devices may have any resolution.

The upper housing 13a has speaker holes 18a and 18b for releasing a sound from a pair of speakers (represented with reference numerals 30a and 30b in FIG. 3) described later. A microphone hole 33 is formed in a hinge section for connecting the upper housing 13a and the lower housing 13b to be freely open and close.

The lower housing 13b has a cross-shaped key 14a, a start switch 14b, a select switch 14c, an A button 14d, a B button 14e, an X button 14f, and a Y button 14g provided there on as input elements. The lower housing 13b also has an L button and an R button (not shown) on side surfaces thereof. A touch panel 15 is attached to a screen of the second LCD 12 as an additional input element. The lower housing 13b has a power switch 19, an insertion hole 35 (represented with one-dot chain line in FIG. 2) for accommodating a memory card 17, and an insertion hole 36 (represented with dashed line in FIG. 2) for accommodating a stick 16.

The touch panel 15 is of a resistance film system. Alternatively, the touch panel 15 may of any press system. The touch panel 15 may be operated with a finger instead of the stick 16. In this embodiment, the touch panel 15 has a resolution of 256 dots×192 dots (detection precision) like the second LCD 12. It is not absolutely necessary that the touch panel 15 has the same resolution as that of the second LCD 12. In this embodiment, the game apparatus 10 may include at least one operation switch or the touch panel 15.

The memory card 17 is a storage medium having a game program stored thereon, and is detachably attachable into the insertion hole 35 provided in the lower housing 13b. The game program may be stored on an internal memory of the game apparatus (preferably non-volatile, but may be volatile), or a program downloaded from a predetermined server (or another game apparatus) may be stored on the internal memory.

Figure 3:
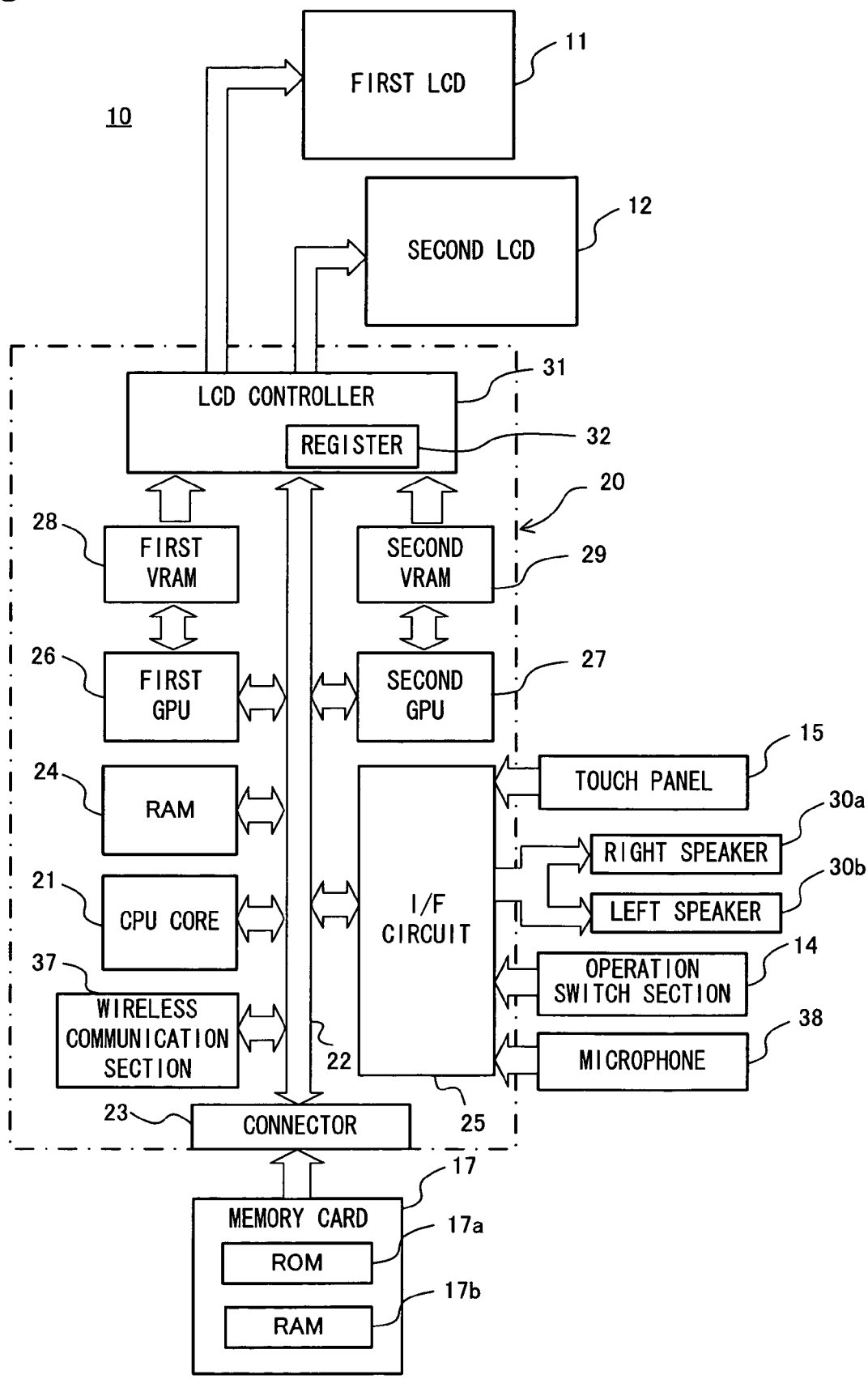
FIG. 3 is a block diagram showing an internal structure of the game apparatus 10.

Next, with reference to FIG. 3, an internal structure of the game apparatus 10 will be described. FIG. 3 is a block diagram showing an internal structure of the game apparatus 3. As shown in FIG. 3, a CPU core 21 is mounted on an electronic circuit board 20 accommodated in the housing 13. The CPU core 21 is connected to a connector 23 and is also connected to an input/output interface circuit (represented as "I/F circuit" in FIG. 3) 25, a first GPU (Graphics Processing Unit) 26, a second GPU 27, a RAM 24, an LCD controller 31, and a wireless communication section 37, via a bus 22. The memory card 17 is detachably connected to the connector 23. The memory card 17 includes a ROM 17a having a game program stored thereon and a RAM 17b having backup data rewritably stored thereon. The game program stored on the ROM 17a of the memory card 17 is loaded onto the RAM 24, and the game program loaded onto the RAM 24 is executed by the CPU core 21. The RAM 24 has stored thereon temporary data obtained by the execution of the game program by the CPU core 21 and data for generating game images, as well as the game program. The I/F circuit 25 is connected to the touch panel 15, a right speaker 30a, a left speaker 30b, an operation switch section 14 including the cross-shaped key 14a, the A button 14d and the like shown in FIG. 2, and a microphone 38. The right speaker 30a and the left speaker 30b are respectively located inside the speaker holes 18a and 18b. The microphone 38 is located inside the microphone hole 33.

The first GPU 26 is connected to a first VRAM (Video RAM) 28, and the second GPU 27 is connected to a second VRAM 29. In response to an instruction from the CPU core 21, the first GPU 26 generates a first game image based on the data stored on the RAM 24 for generating game images, and draws the first game image in the first VRAM 28. Similarly, in response to an instruction from the CPU core 21, the second GPU 27 generates a second game image and draws the second game image in the second VRAM 29. The first VRAM 28 and the second VRAM 29 are connected to the LCD controller 31.

The LCD controller 31 includes a register 32. The register 32 stores the value of "0" or "1" in accordance with an instruction from the CPU core 21. When the value in the register 32 is "0", the LCD controller 31 outputs the first game image drawn in the first VRAM 28 to the first LCD 11, and outputs the second game image drawn in the second VRAM 29 to the second LCD 12. When the value in the register 32 is "1", the LCD controller 31 outputs the first game image drawn in the first VRAM 28 to the second LCD 12, and outputs the second game image drawn in the second VRAM 29 to the first LCD 11.

The wireless communication section 37 has a function of transmitting and receiving data used for game processing and other data with the wireless communication sections of the other game apparatuses. The game apparatus 10 can be connected to a wide area network such as the Internet or the like via the wireless communication section 37, and can communicate with the other game apparatuses via the network.

(Overview of the Operation of the Game System)

Next, with reference to FIG. 4 through FIG. 6, an overview of the operation performed by the game system will be described. In this embodiment, an ensemble game is performed by a plurality of game apparatuses 10 each for allowing a player to play. In the ensemble game, a plurality of players each play a part of a plurality of parts of a tune. More specifically, each player is assigned a part of the tune, and each player plays the assigned part using the game apparatus 10. One part may be played by a plurality of players. A play content performed by each player is transmitted to the other game apparatuses 10, and each game apparatus 10 obtains the play contents performed by all the game apparatuses 10. Each game apparatus 10 outputs the sounds of all the parts using the obtained play contents. Namely, each game apparatus 10 outputs the sounds as an ensemble. In this game, the play contents performed on the plurality of game apparatuses 10 are combined and output as an ensemble by the above-described processing. Thus, the plurality of players can play ensemble.

Now, a play operation using a game apparatus 10 will be described. In a period in which a tune is allowed to be played (play period), when the player performs an operation of pressing one of predetermined play buttons, the game apparatus 10 outputs a sound of an own part thereof. In this embodiment, there are ten types of play buttons, i.e., up, down, right and left buttons of the cross-shaped key 14a, the A button 14d, the B button 14c, the X button 14f, the Y button 14g, the L button and the R button. The part of the game apparatus 10 is the part assigned to the player of the game apparatus 10. In this embodiment, a different tone step is output in accordance with the type of button pressed. Specifically, eight types of buttons, i.e., the up, down, right and left buttons of the cross-shaped key 14a, and the buttons 14d through 14g, are respectively assigned eight tone steps, i.e., do, re, mi, fa, so, la, si and do. When the L button is pressed, the sound is changed by a half tone step. When the R button is pressed, the sound is changed by one octave. Thus, the player can play his/her part using these ten types of play buttons. As described later in detail, in this embodiment, the player can select the difficulty level of the play operation from three levels. Depending on the difficulty level, the player may use less than ten types of buttons.

The tone color is changed in accordance with the part. The game apparatus 10 stores sound data on each musical instrument and each tone step. Specifically, for a tune including a part of piano and a part of guitar, the game apparatus 10 stores sound data on each tone step for piano and on each tone step for guitar. For playing, the game apparatus 10 assigned the part of piano uses the sound data for piano, and the game apparatus 10 assigned the part of guitar uses the sound data for guitar.

In this embodiment, each button is assigned a fixed tone step. Alternatively, even when the same button is pressed, different tone steps may be output for different tunes or for different portions of one same tune. In this case, data representing a tone step which is output when one certain type of button is pressed is defined for each tune (and/or for each portion of the tune). The game apparatus 10 stores the data defined in this manner and uses the data when performing the ensemble game.

The sound may be output when a button is operated. Alternatively, the sound may be output only when a button is operated at a correct timing. In the latter case, specifically, a correct timing for outputting the sound is defined. The game apparatus 10 determines whether or not the timing at which the button was operated is within the tolerable range based on the correct timing. Only when the determination result is positive, the sound is output at the correct timing. Alternatively, the sound may be output only when a correct button operation is performed, or the sound may be output when a button is performed, regardless of whether the button operation is correct or not.

In this game, during the period in which a tune is allowed to be played, an instruction image of the play operation for the tune to be played is displayed on the screen of the game apparatus 10. The instruction image of the play operation instructs the player when to operate the button (and additionally the type of the button). The player performs the play operation in accordance with the instruction displayed on the screen. FIG. 4 shows an exemplary game image displayed on the screen of the game apparatus 10. As shown in FIG. 4, three gauges (for example, a gauge 41), a pair of cursors 42, a plurality of operation instruction images (for example, operation instruction images 43 and 44), and a plurality of operation period images (for example, an operation period image 45) are displayed on the screen of the first LCD 11 or the second LCD 12. The game image shown in FIG. 4 instructs the player when to perform the play operation (and additionally, the type of the play) for the part assigned to the player and the game apparatus 10.

The gauges are longer in a horizontal direction and arranged in a vertical direction so as to be parallel to one another. The gauges are scaled. In the case of four-four time, one gauge is divided into, for example, 16 rectangles; and in the case of four-three time, one gauge is divided into, for example, 12 rectangles. The pair of cursors 42 are located at the same position with respect to the left-right direction, and one is located above the gauge and the other is located below the gauge. The operation instruction images and the operation period images are located on the gauges. The operation instruction images include images representing one of the eight types of play buttons (up, down, right and right arrows, and letters of A, B, X, Y, L and R). The operation period images are optionally located to the right of the operation instruction images. Since different game apparatuses 10 included in the game system are assigned different parts, each game apparatus 10 displays the operation instruction images and the operation period images at different positions. The instruction images for the play operation may be in various other forms as is easily understood by those skilled in the art. The instruction images of the play operation may be like a general music sheet with cursors for representing the operation timing. Alternatively, operation instruction images may be displayed as moving toward a predetermined position, and the operation timing may arrive when the operation instruction images reach the predetermined positions.

When the play period starts, the pair of cursors 42 move from left to right along the gauge as time passes. When reaching the right end of the gauge, the cursors 42 move to the left end of the gauge immediately below. The screen is scrolled upward as the cursors 42 move, such that the cursors 42 are always displayed on the screen. Namely, the gauges move upward, and new gauges with operation instruction images and operation period images appear from the bottom of the screen.

The gauge with each instruction image (operation instruction images and the operation period images) corresponds to a play operation instruction, i.e., a music sheet, and shows the timing to press a play button and the type of the play button to press. Specifically, the player performs an operation represented by the operation instruction images at the timing when the operation instruction images are designated by the cursors 42 (at the timing when the operation instruction images are interposed between the pair of cursors 42). For example, when the image shown in FIG. 4 is displayed, the cursors 42 designate the operation instruction image representing the R button and the operation instruction image representing the right button (representing the right direction) of the cross-shaped key 14a. Therefore, the player performs an operation of pressing the R button and the right button of the cross-shaped key 14a simultaneously. The operation period image represents the length of time in which the play button needs to be pressed. The player keeps pressing the play button while the moving cursors 42 keep designating the operation period image. For example, the operation period image 45 shown in FIG. 4 shows that the B button 14e needs to be pressed for the period corresponding to two rectangles. When a play button needs to be pressed for the period corresponding to one rectangle, the operation period image is not provided. The player can correctly play the tune by pressing the play buttons in accordance with the instruction images located on the gauges.

By performing the play operation as described above, the player can play his/her part. For realizing an ensemble play, it is conceivable that the game apparatus 10 sequentially obtains data representing the play contents of the other parts assigned to the other game apparatuses 10 while playing itself, and outputs the sounds of the other parts based on the obtained data. However, with this method, there occurs a delay for receiving the data from the other game apparatuses, especially when the data is to be received by communication via the network. As a result, the game apparatus 10 outputs the sounds of the other parts after the sound of the own part. For an ensemble, the game apparatus 10 needs to synchronize the sounds of the other parts and the own part, which is not possible with the above-mentioned method.

In this embodiment, for providing an ensemble of a tune, each player plays twice, i.e., a rehearsal play and a play for real. Each game apparatus 10 sets two play periods, i.e., a first play period for rehearsal (rehearsal play period) and a second play period for play for real (play-for-real period). Specifically, each game apparatus 10 obtains data representing the play contents of the rehearsal from the other game apparatuses 10 during, or after, the rehearsal play period. During the play-for-real period, the game apparatus 10 outputs the sound of the own part, and also the sounds of the other parts using the obtained data. Thus, the game apparatus 10 can output the sound of its own player and the sounds of other players during the play-for-real period with no unnaturalness.

Figure 5:
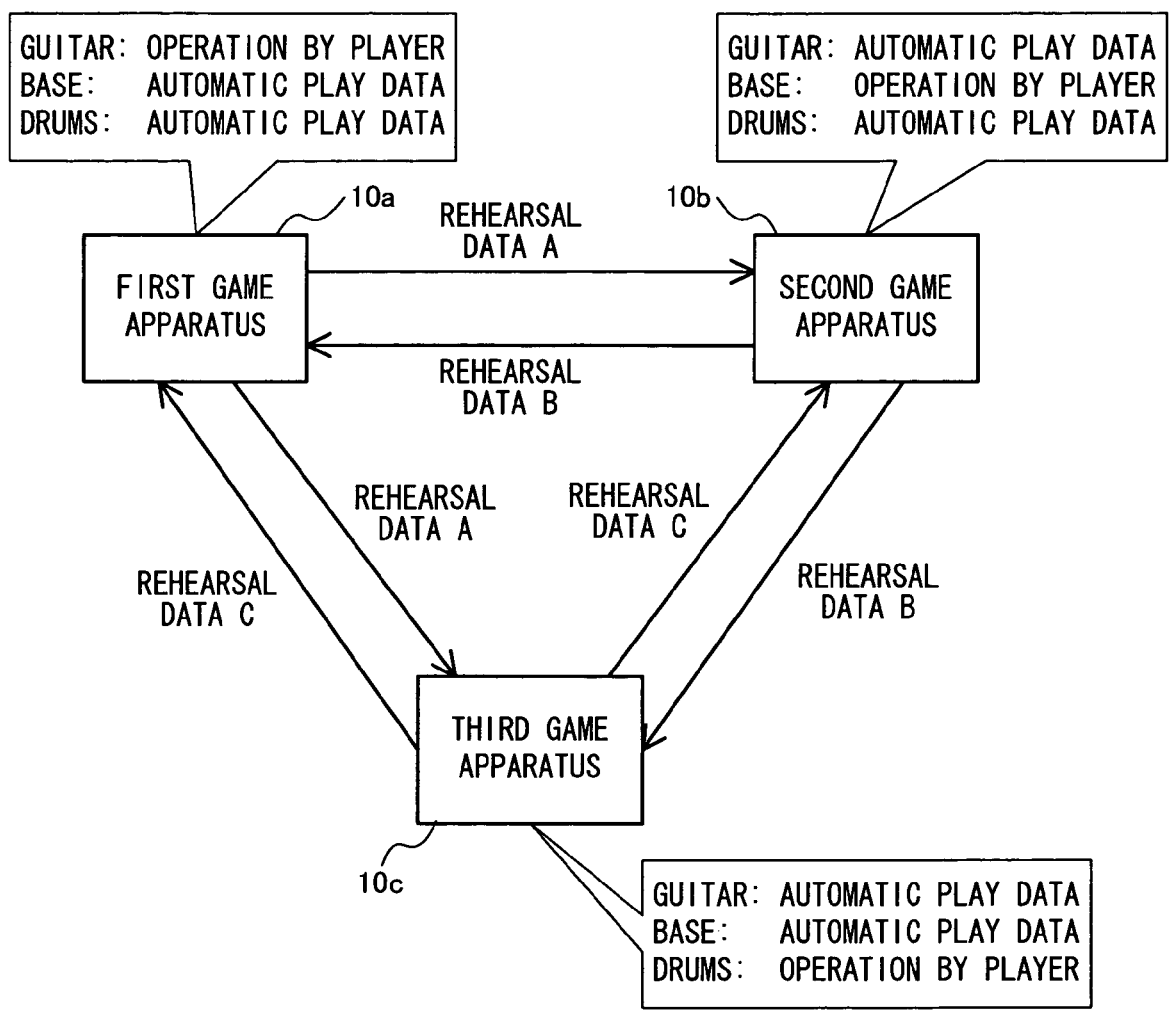
FIG. 5 shows an operation of the game apparatuses 10a through 10b in a rehearsal play period.
Figure 6:
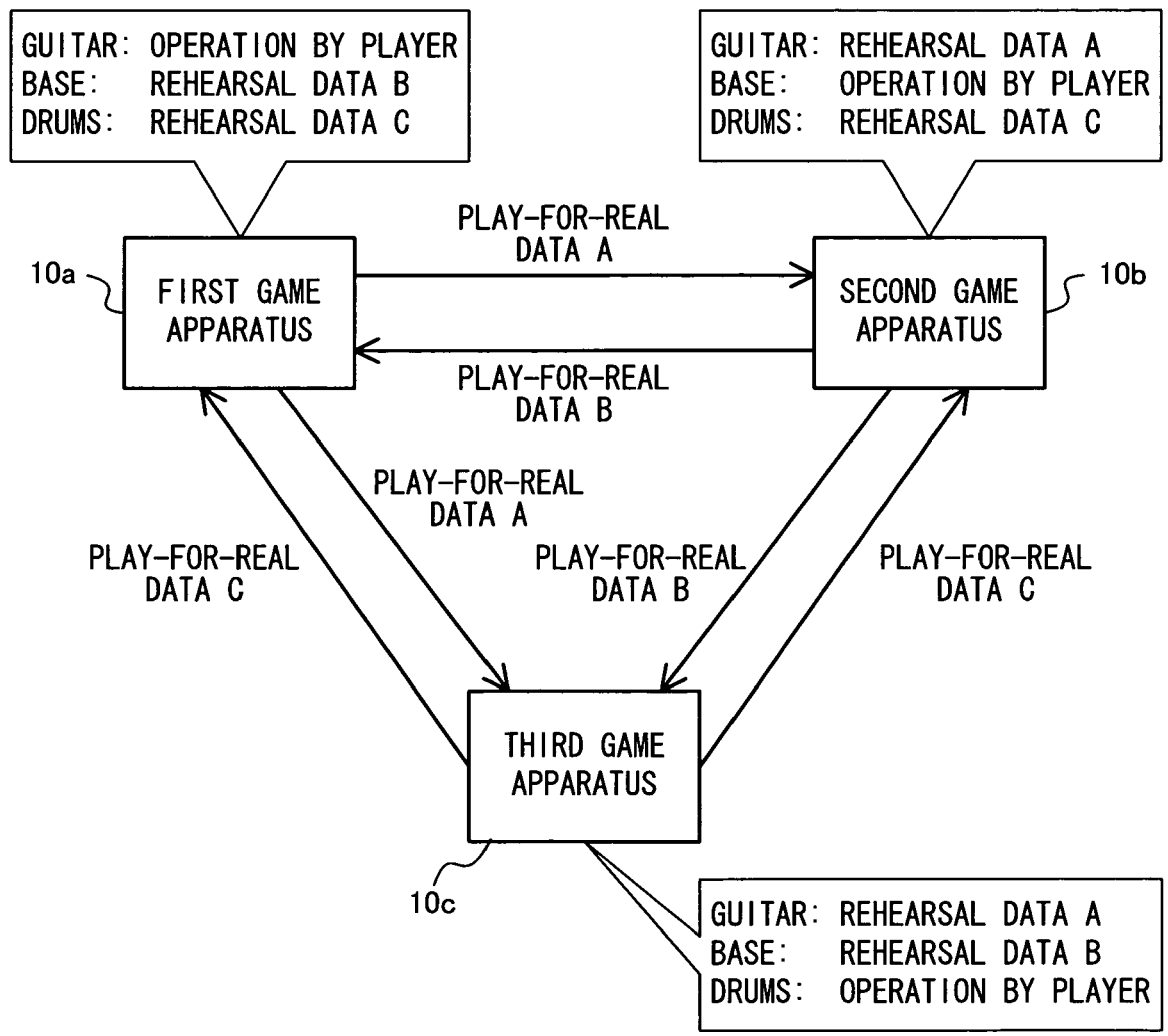
FIG. 6 shows an operation of the game apparatuses 10a through 10b in a play-for-real period.

FIG. 5 and FIG. 6 illustrate an operation of the game system. FIG. 5 and FIG. 6 show a case where a tune including three parts of guitar, base, and drums is played ensemble by the three game apparatuses 10a through 10c. In FIG. 5 and FIG. 6, the first game apparatus 10a is assigned the part of guitar, the second game apparatus 10b is assigned the part of base, and the third game apparatus 10c is assigned the part of drums.

The first, second and third game apparatuses 10a, 10b and 10c are provided as a game apparatus group defined by a predetermined server. In more detail, the first, second and third game apparatuses 10a, 10b and 10c each have a memory card mounted thereon storing a program of the ensemble game, and execute the program (or execute a program built in the game apparatus itself) to transmit data indicating a wish to perform the ensemble game to the predetermined server (server 1 in FIG. 1). The server 1 sets these game apparatuses 10a, 10b and 10c as a group of game apparatuses for performing the ensemble game. Even a game apparatus which does not have a memory card storing the ensemble game program may convey a wish to perform the ensemble game to the server. In this case, such a game apparatus transmits data indicating such a wish to the server, obtains a program for receiving the ensemble game program in the game apparatus itself, and receives the ensemble game program from the server. Thus, the game apparatus can perform the ensemble game.

Before the ensemble game is started, processing for determining a part for each of the game apparatuses in the group, i.e., the first game apparatus 10a, the second game apparatus 10b and the third game apparatus 10c, is executed. This processing is executed, for example, as described later with reference to FIG. 10. The part determined by this processing is referred to during the rehearsal period and also during the play-for-real period. Also before the ensemble game is started, processing for selecting common tune data to the game apparatuses 10a, 10b and 10c in the group is executed. The data of the tune selected by this processing is referred to during the rehearsal period and also during the play-for-real period.

FIG. 5 shows an operation of the game apparatuses 10a, 10b and 10c during the rehearsal period. During the rehearsal period, each player plays his/her part on the respective game apparatus 10. The game apparatus 10 transmits play data representing a play content performed by its player to the other game apparatuses (see FIG. 5). The play data representing the play content performed during the rehearsal period will be referred to as "rehearsal data". Referring to FIG. 5, rehearsal data A representing the play content performed on the first game apparatus 10a is transmitted to the second game apparatus 10b and the third game apparatus 10c. Rehearsal data B representing the play content performed on the second game apparatus 10b is transmitted to the first game apparatus 10a and the third game apparatus 10c. Rehearsal data C representing the play content performed on the third game apparatus 10c is transmitted to the first game apparatus 10a and the second game apparatus 10b.

During the rehearsal period, the game apparatuses 10a through 10c each output the sound of the own part in accordance with the operation by the player and also outputs the sounds of the other parts. The game apparatuses 10a through 10c execute different types of processing in accordance with their own parts. Specifically, each game apparatus 10 displays the play operation instruction images corresponding to the own part, and outputs the sound in accordance with the operation by the player while automatically outputting the sounds of the other parts. For example, the first game apparatus 10a assigned the part of guitar outputs the sound of guitar in accordance with the operation by the player while outputting the sounds of base and drums using the tune data. In this embodiment, during the rehearsal period, an ensemble with the other players is not provided, but the sounds of the other parts are generated using the tune data and output. Therefore, during the rehearsal period, the player can practice so as to coordinate his/her own part to the other parts and be ready for the play-for-real period. In another embodiment, background music (including accompaniments and sounds which are not directly relevant to the tune) may be output in concert with the sound of each part of the tune.

FIG. 6 shows an operation of the game apparatuses 10a, 10b and 10c during the play-for-real period. During the play-for-real period, like during the rehearsal period, each player plays his/her part on the respective game apparatus 10. Namely, the game apparatuses 10a through 10c each output the sound of the own part in accordance with the operation by the player. The game apparatuses 10a through 10c execute different types of processing in accordance with their own parts. Specifically, each game apparatus 10 displays the play operation instruction images corresponding to the own part, and outputs the sound in accordance with the operation by the player while generating the sounds of the other parts using the rehearsal data obtained during the rehearsal period and outputting such sounds. Therefore, during the play-for-real period, the player can play ensemble by coordinating the timing of his/her own play with the timing of the plays of the other players.

In this embodiment, during the play-for-real period, the game apparatus 10 transmits data representing the play content performed for the own part to the other game apparatuses when necessary (see FIG. 6). The play data representing the play content during the play-for-real period will be referred to as the "play-for-real period data". Referring to FIG. 6, playfor-real period data A representing the play content performed on the first game apparatus 10a is transmitted to the second game apparatus 10b and the third game apparatus 10c. Play-for-real period data B representing the play content performed on the second game apparatus 10b is transmitted to the first game apparatus 10a and the third game apparatus 10c. Play-for-real period data C representing the play content performed on the third game apparatus 10c is transmitted to the first game apparatus 10a and the second game apparatus 10b. Thus, the game apparatus 10 can obtain the play-for-real period data representing the play contents of the other game apparatuses during the play-for-real period. In this embodiment, the game apparatus 10 calculates a score for evaluating a play result during the play-for-real period. The obtained play-for-real data is used for calculating the score.

As described above, according to this embodiment, the each player plays twice, i.e., a rehearsal play and a play for real. During the play for real, the game apparatus 10 outputs the sound of the own part in accordance with the operation by the player while generating the sounds of the other parts using the rehearsal data already obtained and outputting such sounds. Therefore, the ensemble can be provided with the sounds of all the parts being coordinated in timing.

(Details of Game Processing)

Figure 7:
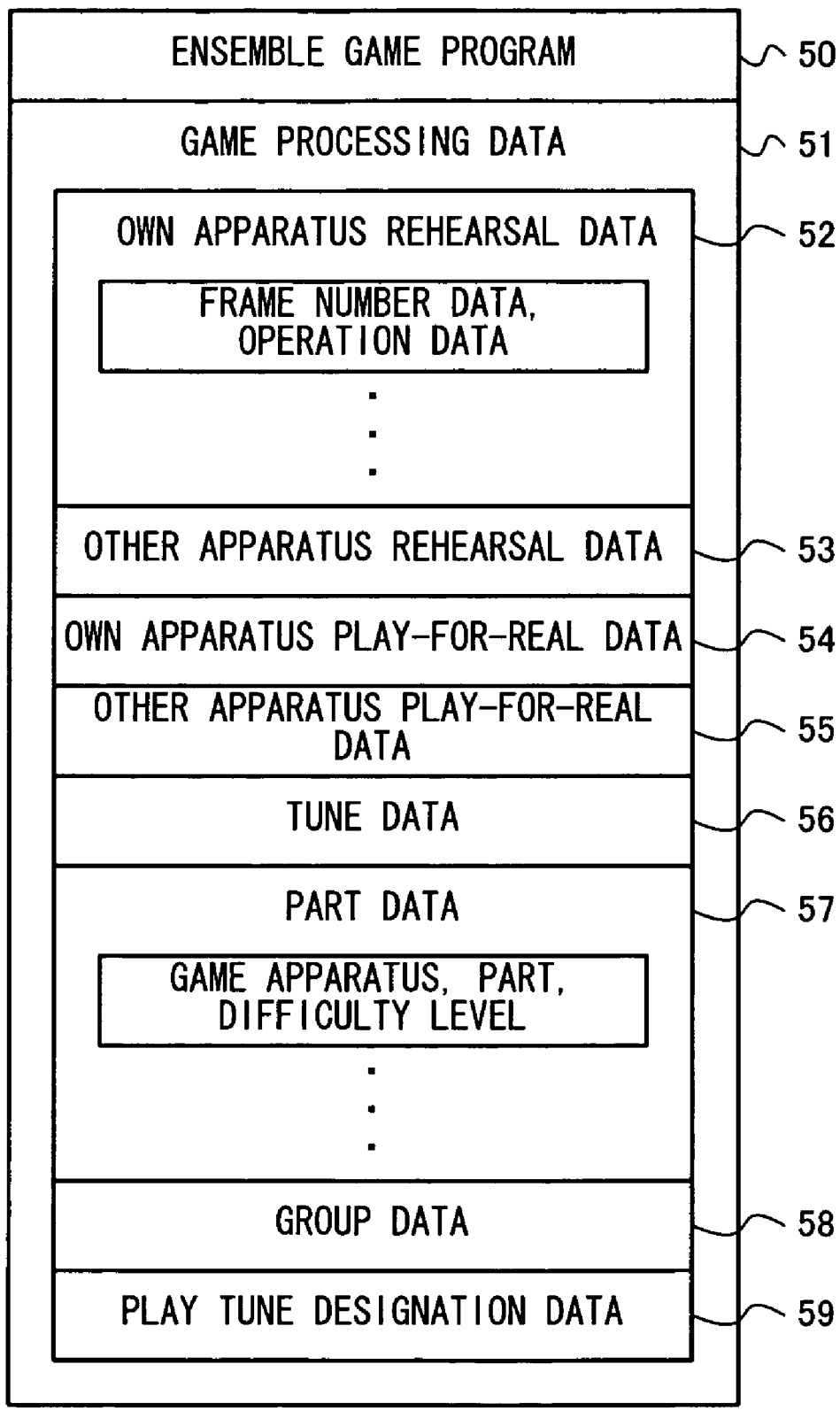
FIG. 7 shows main data stored on a RAM 24 of the game apparatus 10.

Next, game processing executed by the game apparatus 10 in this embodiment will be described. First, referring to FIG. 7, main data used for the game processing will be described. FIG. 7 shows main data stored on the RAM 24. As shown in FIG. 7, the RAM 24 has stored thereon a game program 50, game processing data 51 and the like. The RAM 24 has stored thereon sound source data required for outputting play sounds of tunes, image data on characters appearing in the game, and other data necessary for the game processing in addition to the data shown in FIG. 7.

The game program 50 is partially or entirely read from the ROM 17a of the memory card 17 and stored on the RAM 24 at an appropriate timing after the game apparatus 10 is powered on. The game program 50 causes the CPU core 21 to execute the game processing (FIG. 8) of the ensemble game described later.

The game processing data 51 includes various data used for executing the game processing (FIG. 8) described later. Specifically, the game processing data 51 includes own apparatus rehearsal data 52, other apparatus rehearsal data 53, own apparatus play-for-real data 54, other apparatus play-for-real data 55, tune data 56, part data 57, group data 58, and play tune designation data 59. The own apparatus rehearsal data 52, the other apparatus rehearsal data 53, the own apparatus play-for-real data 54, the other apparatus play-for-real data 55, and the part data 57 are generated by executing the program and stored on the RAM 24. The tune data 56 is stored in advance on the ROM 17a and is read into and stored on the RAM 24. The game processing data includes sound data for each tone step for each part (musical instrument) in addition to the above-mentioned data.

The own apparatus rehearsal data 52 is generated by the respective game apparatus 10. The own apparatus rehearsal data 52 represents the content of the rehearsal play of the part assigned to the respective game apparatus 10 (the own part). In this embodiment, the own apparatus rehearsal data 52 includes operation data obtained from the operation switch section 14 at an interval of a frame time (1/60 sec.) (data representing which button has been operated) and frame number data representing the frame time at which such operation data was obtained. The frame number is, for example, 1 at the start of the rehearsal play, and then is incremented. Thus, the frame number represents the time point during the rehearsal period. The own apparatus rehearsal data 52 includes a plurality of sets of operation data and frame number data. By referring to the own apparatus rehearsal data 52, the game apparatus 10 can learn which button was pressed at which time during the rehearsal period. The rehearsal data or the play-for-real data described later may not include frame number data. For example, in the case where the operation data is arranged frame by frame, the time point during the play can be specified by an index of the arrangement instead of by the frame number.

The other apparatus rehearsal data 53 is rehearsal data generated by the other game apparatus. The other apparatus rehearsal data 53 represents the content of the rehearsal play of the part assigned to the other game apparatus (the other part). In this embodiment, like the own apparatus rehearsal data 52, the other apparatus rehearsal data 53 includes a plurality of sets of operation data and frame number data. In the case where three or more game apparatuses perform the ensemble game (i.e., in the case where there are a plurality of other game apparatuses which perform the ensemble with the game apparatus 10), the other apparatus rehearsal data 53 is stored for each of the other apparatuses.

The own apparatus play-for-real data 54 is generated by the respective game apparatus 10. The own apparatus play-for-real data 54 represents the content of the play for real of the part assigned to the respective game apparatus 10 (the own part). In this embodiment, like the own apparatus rehearsal data 52, the own apparatus play-for-real data 54 includes a plurality of sets of operation data and frame number data. The other apparatus play-for-real data 55 is generated by the other game apparatus. The other apparatus play-for-real data 55 represents the content of the play for real of the part assigned to the other game apparatus (the other part). In this embodiment, like the other apparatus rehearsal data 53, the other apparatus play-for-real data 55 includes a plurality of sets of operation data and frame number data. In the case where three or more game apparatuses perform the ensemble game, the other apparatus play-for-real data 55 is stored for each of the other apparatuses.

In this embodiment, the play data 52 through 55 each include data representing the time point during the play period (frame number data) and data representing the play operation performed by the player (operation data). The play data 52 through 55 may be any information which can specify the content of the play provided by the player and reproduce the content of the play. For example, the play data 52 through 55 may each represent the correspondence between the frame number and the sound to be output at the time indicated by the frame number.

The tune data 56 includes play output information of the tune and play operation instruction information. Specifically, the tune data 56 includes, for each of the parts forming the tune, data representing the correspondence among a frame number, the button operation to be performed at the time indicated by the frame number, and the sound to be output in accordance with the button operation. The tune data 56 is used as the play output information and the play operation instruction information. The tune data 56 may further include audio file data representing background music for the sound output in accordance with the operation by the player. The audio file data is used as the play output information. The game apparatus 10 uses the tune data 56 to generate a play sound in accordance with the operation by the player, generate an automatic play sound of the other parts, or determine the arrangement of the instruction images displayed on the screen. The automatic play sound of the other parts may be provided by reproducing audio file data prepared for each part or by outputting a sound by program processing based on the play operation instruction information.

The game apparatus 10 may store the tune data 56 on a plurality of tunes. Alternatively, each game apparatus may form a tune data storage area in an available nonvolatile memory (for example, the RAM 17b) and store tune data downloaded from a predetermined server (which has data on a plurality of tunes stored thereon) in the tune data storage area. Still alternatively, tune data may be generated based on the input by the player on each game apparatus, and the generated data may be stored in the tune data storage area. In such cases, the game apparatuses included in the game system may possibly store different tune data.

The part data 57 represents the correspondence between the game apparatus and the part assigned to the game apparatus for providing the ensemble. More specifically, the part data 57 associates identification information on each game apparatus and identification information on the corresponding part. In this embodiment, the part data 57 also represents the correspondence between the game apparatus and the difficulty level set in the game apparatus.

The difficulty level will be described. In this embodiment, there are a plurality of difficulty levels for the play operation. The player can select one of the difficulty levels. Specifically, there are three difficulty levels of 1, 2 and 3. The number of buttons used as the play buttons varies depending on the difficulty level. At the highest difficulty level of 3, all the above-mentioned ten types of buttons are used. The play operation described above with reference to FIG. 4 is adopted. At the medium difficulty level of 2, eight types of buttons other than the L button and the R button are used. At level 2, the eight types of play buttons are assigned different tone steps like at level 3. Since the L button and the R button are not used, adjustment by a half tone or one octave is performed automatically. With the game image displayed at level 2, the operation instruction images representing the eight types of play buttons are displayed on the gauges. At the lowest difficulty level of 1, only one arbitrary type of play button is used. The tone step and octave of the sound to be output are determined automatically. In the game image displayed at level 1, an operation instruction image representing only one type of play button is displayed on the gauges. In another embodiment, the number of difficulty levels may not be three. For example, there may be four difficulty levels, including a slightly low level at which two types of play buttons are used.

The group data 58 represents the identification information of the other game apparatus belonging to the same group. The play tune designation data 59 is data for identifying the tune played by the players (play tune) during the rehearsal and the play for real.

Figure 8:
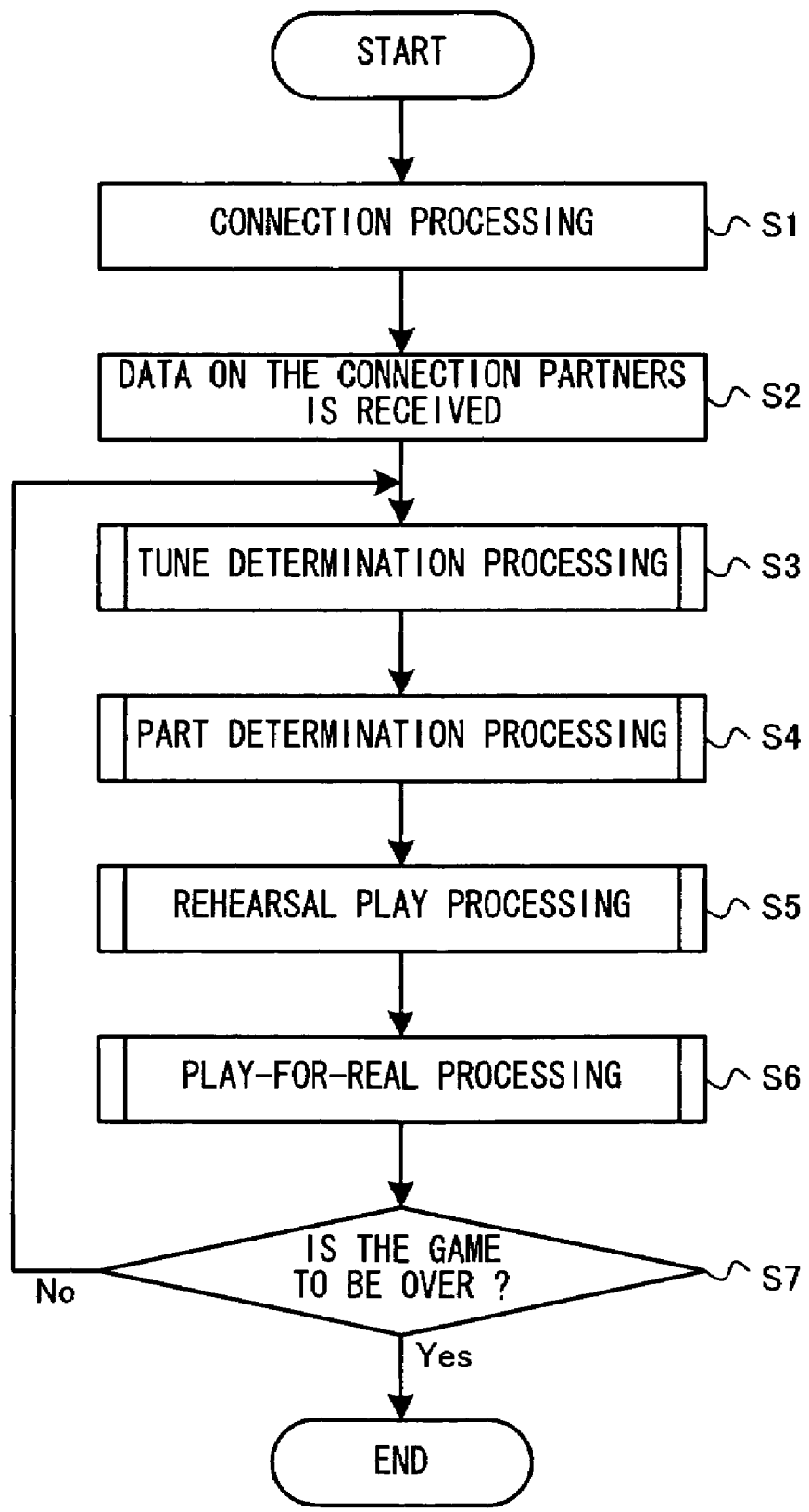
FIG. 8 is a flowchart illustrating a flow of game processing executed by the game apparatus 10.

Now, the game processing executed by the game apparatus 10 will be described in detail with reference to FIG. 8 through FIG. 14. FIG. 8 is a flowchart illustrating a flow of the game processing executed by the game apparatus 10. When the game apparatus 10 is turned on, the CPU core 21 of the game apparatus 10 executes a start program stored on a boot ROM (not shown) to initialize the elements including the RAM 24. The game program stored on the memory card 17 is read onto the ROM 24, and the CPU core 21 starts executing the game program. The flowchart shown in FIG. 8 illustrates the game processing executed after the above-described processing is completed.

Referring to FIG. 8, in step S1, the CPU core 21 executes connection processing to the server 1. As described above, the server 1 executes matching processing, i.e., processing of determining a group of game apparatuses which are to provide an ensemble together. Namely, by the processing in step S1, the game apparatus 10 requests the server 1 to execute the matching processing. Specifically, the CPU core 21 transmits matching request data including information for identifying the own apparatus (i.e., an IP address) to the server 1 via the wireless communication section 37. Upon receipt of the matching request data, the server 1 selects, as a connection partner, a game apparatus which is to provide an ensemble with the game apparatus 10 from other game apparatuses which have transmitted matching request data. The matching request data to be transmitted from the game apparatus 10 to the server 1 may include information for identifying the game program stored on the memory card 17 (game program ID). In this case, the server 1 selects, as a connection partner of the game apparatus 10, another game apparatus which has transmitted matching request data including the same game program ID. The game program ID is stored on the memory card 17 together with the game program.

In this embodiment, the matching request data to be transmitted from the game apparatus 10 may include number data representing a numerical figure in a predetermined range. The numerical figure for the number data is designated by the player. When receiving matching request data including the number data, the server 1 selects, as a connection partner of the game apparatus 10, another game apparatus which has transmitted matching request data including number data representing the same numerical figure. The number data is useful when, for example, a player wishes to perform the ensemble game with his/her friend. A group of friends can determine a certain numerical figure for the number data in advance. Then, the server 1 matches the game apparatuses of those friends, and they can perform the ensemble game together.

The method for matching is not limited to the above-described method. Matching request data including a certain condition may be transmitted, or the server 1 may randomly select game apparatuses. With the former method, for example, matching request data including data representing the familiarity with the game may be transmitted, so that the game apparatuses having about the same level of familiarity with the game can be matched.

When a predetermined upper limit number of connection partners are selected, or when a predetermined time period has passed after a predetermined number of connection partners which is less than the upper limit are selected, the server 1 terminates the matching processing. Thus, a group of the game apparatus 10 and game apparatuses selected as connection partners are formed. For the ensemble game, the upper limit number is preferably the number of the parts forming the tune. The predetermined number or the predetermined time period may be set by the game apparatus 10. When terminating the matching processing, the server 1 transmits, to each of the game apparatuses in the group, data for identifying the game apparatuses selected as their connection partners. In this embodiment, the server 1 selects one of the game apparatuses in the group as a leader, and notifies the selected game apparatus to that effect when transmitting the above data.

In step S2, the CPU core 21 receives the data representing the identification information on the connection partners from the server 1 and registers (stores) the data as the group data 58 in the RAM 24. Thus, the game apparatus 10 is capable of communicating with the other game apparatuses in the group. After this, the game apparatuses in the group directly communicate with one another without the server 1. In this embodiment, a plurality of game apparatuses included in the group are determined using the server 1. A plurality of game apparatuses included in the group may be determined by any other method, and it is not absolutely necessary to use the server 1. After the matching processing, the game apparatuses may communicate via the server 1. After step S2, processing in step S3 is executed.

The processing in steps S1 and S2 may be executed by a program built in the game apparatus 10, instead of the game program stored on the memory card 17. Then, even a game apparatus which does not have the memory card 17 can join the ensemble game. In this case, the game program is transmitted to that game apparatus from the server 1 or other game apparatuses (typically, the matched game apparatuses) and this game program is executed.

In step S3, tune determination processing is executed. The tune determination processing is processing of determining a tune to be played in the ensemble game. Hereinafter, with reference to FIG. 9, the tune determination processing will be described in detail.

Figure 9:
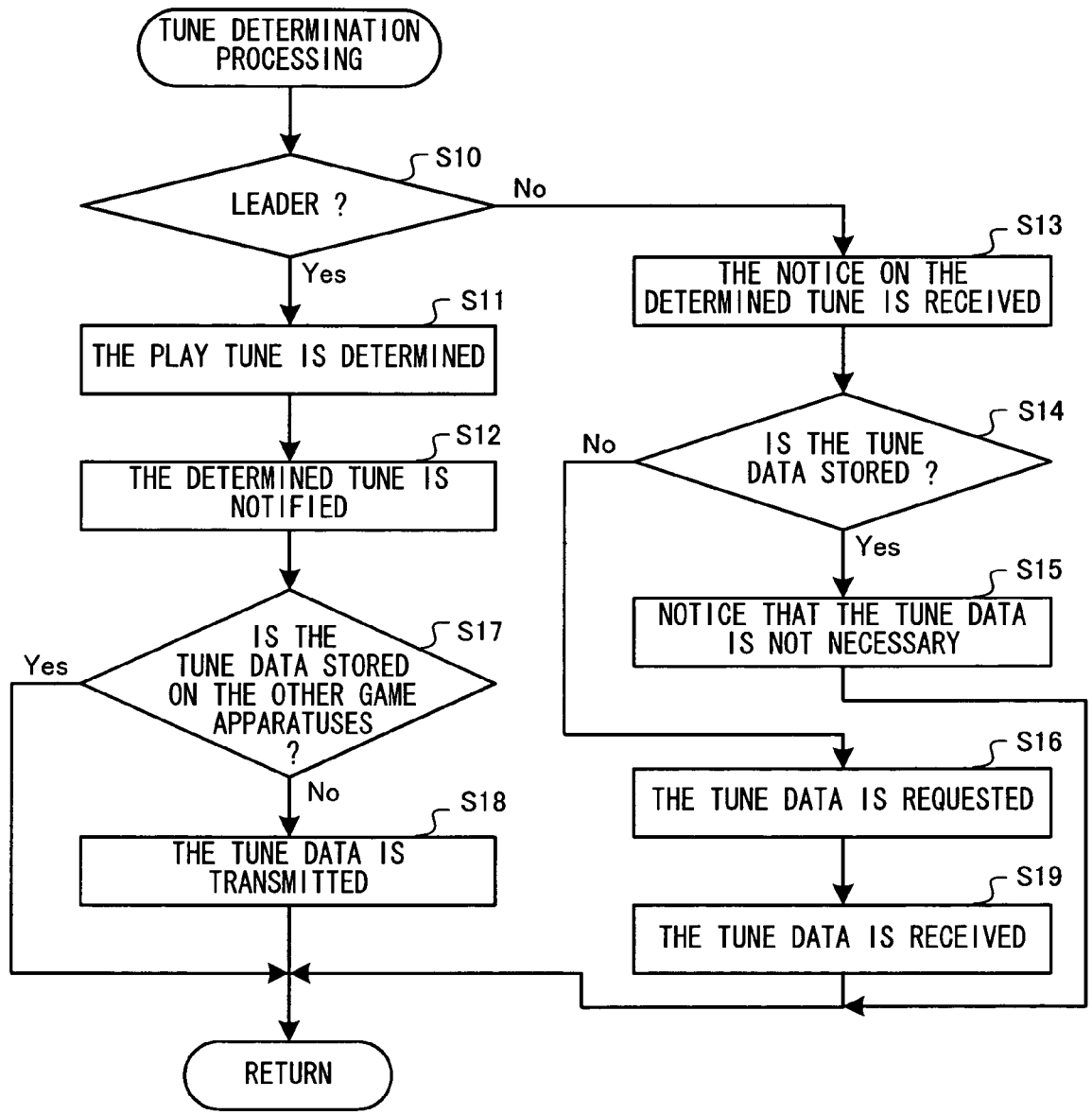
FIG. 9 is a flowchart illustrating tune determination processing (step S3) shown in FIG. 8 in detail.

FIG. 9 is a flowchart illustrating the tune determination processing (step S3) shown in FIG. 8 in detail. The tune determination processing is executed as follows. First, in step S10, the CPU core 21 determines whether or not the own game apparatus is set as a leader. When the determination result in step S10 is positive, processing in step S11 is executed. When the determination result in step S10 is negative, processing in step S13 is executed.

In the leader game apparatus, processing in step S11 is executed. In step S11, the CPU core 21 determines the tune to be played in the two play periods. The tune is determined by the player of the game apparatus 10 designating a desired tune among tunes, the tune data 56 of which is stored on the RAM 24. Then, data for identifying the determined tune is registered in the RAM 24 as play tune designation data 59. In this embodiment, the player using the leader game apparatus can determine the tune to be played. In another embodiment, the tune to be played may be randomly determined among tunes, the tune data 56 of which is stored on the RAM 24. Hereinafter, the tune determined in step S11 will be referred to as a "play tune".

Next in step S12, the CPU core 21 notifies the other game apparatuses of the play tune. Specifically, data representing the play tune (the play tune designation data 59) is transmitted to the other game apparatuses from the wireless communication section 37 via the network. In the leader game apparatus, after step S12, processing in step S17 described later is executed.

In a non-leader game apparatus, processing in step S13 is executed. In step S13, the CPU core 21 receives the notice on the determined play tune (step S12) by the wireless communication section 37. Specifically, the CPU core 21 receives the play tune designation data 59 from the leader game apparatus and registers the play tune designation data 59 in the RAM 24. Thus, the non-leader game apparatus can learn the play tune.

Next in step S14, the CPU core 21 determines whether or not the tune data of the play tune is stored on the RAM 24 of the own game apparatus. In this embodiment, the game apparatus 10 can newly store tune data created by the player or obtain new tune data from other game apparatuses. Accordingly, the tune data stored does not necessarily match among the game apparatuses. Tune data which is stored in one game apparatus may not be stored in another game apparatus. When the determination result in step S14 is positive, processing in step S15 is executed. When the determination result in step S14 is negative, processing in step S16 is executed.

In step S15, the CPU core 21 notifies the leader game apparatus that the transmission of the tune data is not necessary. In step S16, the CPU core 21 requests the leader game apparatus to transmit the tune data. Namely, a non-game apparatus, when not having stored thereon the tune data of the play tune, requests the transmission of the tune data via the wireless communication section 37; and when having stored thereon the tune data of the play tune, notifies that the transmission is not necessary via the wireless communication section 37. After step S15, the CPU core 21 terminates the tune determination processing shown in FIG. 9. After step S16, the CPU core 21 executes processing in step S19 described later.

In the leader game apparatus, after step S12, processing in step S17 is executed. In step S17, the CPU core 21 determines whether or not all the other game apparatuses have stored thereon the tune data of the play tune. The determination in step S17 can be made based on the information transmitted from the other game apparatuses in step S15 or S16. Specifically, when at least one game apparatus has requested the transmission of the tune data, the determination result in step S17 is negative. When all the other game apparatuses have notified that the transmission of the tune data is not necessary, the determination result in step S17 is positive. When the determination result in step S17 is negative, processing in step S18 is executed. When the determination result in step S17 is positive, processing in step S18 is, skipped and the CPU core 21 terminates the tune determination processing shown in FIG. 9.

In step S18, the CPU core 21 transmits the tune data of the play tune to the at least one other game apparatus which has requested the transmission of the tune data, i.e., the at least one other game apparatus which does not have stored thereon the tune data, via the wireless communication section 37.

In a non-leader game apparatus, after step S16, processing in step S19 is executed. In step S19, the CPU core 21 receives, by the wireless communication section 37, the tune data transmitted from the leader game apparatus in step S18. Thus, the non-leader game apparatus can provide an ensemble of the tune which is not known thereto (the tune, the data of which has not been stored thereon), and increase the number of playable tunes. After step S19, the CPU core 21 terminates the tune determination processing shown in FIG. 9.

Returning to FIG. 8, in step S4 after step S3, part determination processing is executed. The part determination processing is processing of determining which game apparatus in the group is to play which part of the play tune determined in step S3. Hereinafter, with reference to FIG. 10, the part determination processing will be described in detail.

Figure 10:
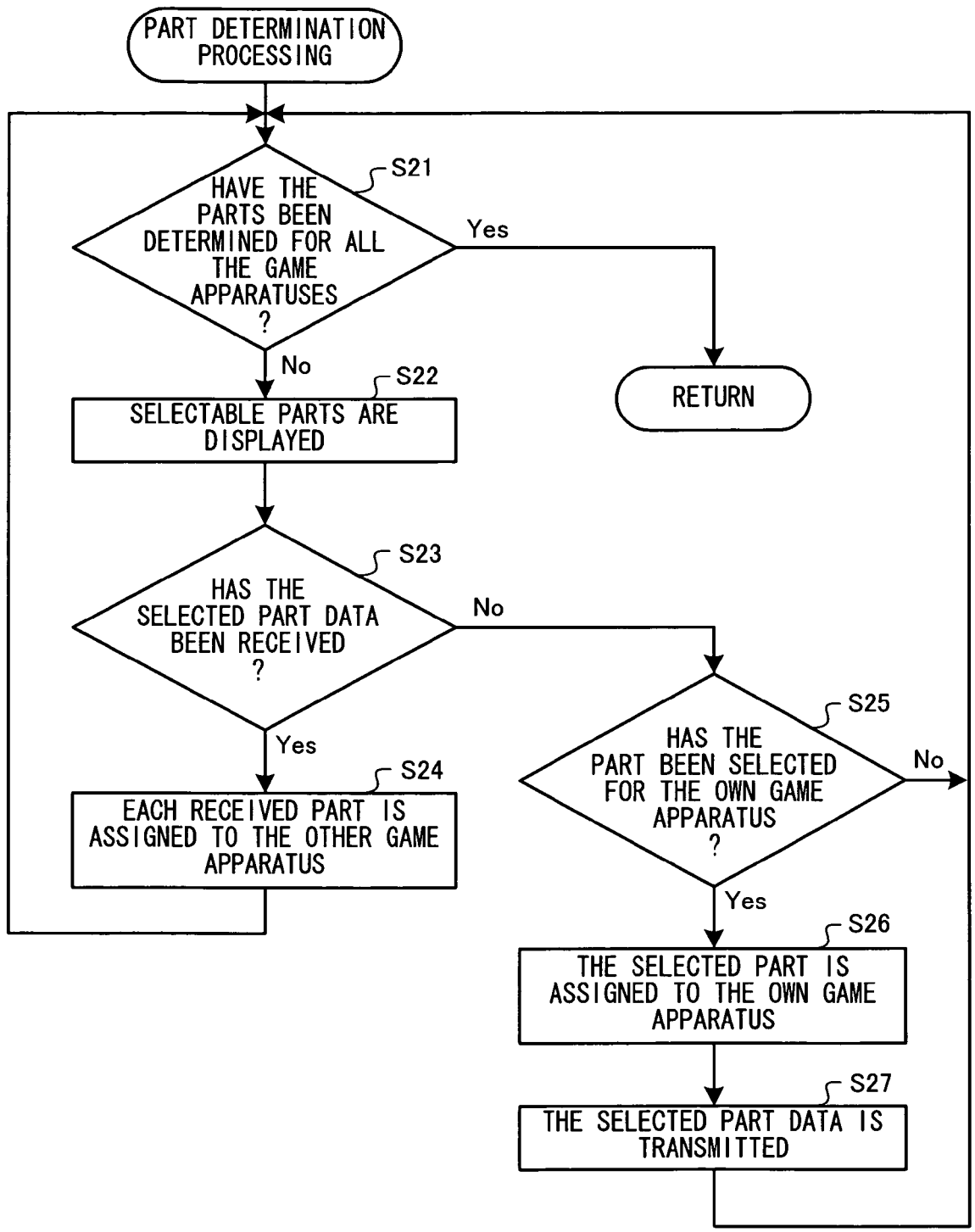
FIG. 10 is a flowchart illustrating part determination processing (step S4) shown in FIG. 8 in detail.

FIG. 10 is a flowchart illustrating the part determination processing (step S4) shown in FIG. 8 in detail. The part determination processing is executed as follows. In step S21, the CPU core 21 determines whether or not the part is determined for all the game apparatuses in the group. The determination in step S21 is made by referring to the part data 57 stored on the RAM 24. When the part data 57 represents the correspondence between the game apparatus and the part regarding all the game apparatuses, it is determined that the part is determined for all the game apparatuses. When the determination result in step S21 is positive, the CPU core 21 terminates the part determination processing shown in FIG. 10. When the determination result in step S21 is negative, processing in step S22 is executed.

In step S22, the CPU core 21 causes the first LCD 11 or the second LCD 12 to display parts which can be selected by the own game apparatus among the parts of the play tune. In this embodiment, one same part is not assigned to a plurality of game apparatuses. In step S22, the parts which have already selected by the other game apparatuses are excluded, and the remaining parts are displayed as being selectable. Specifically, the parts included in the part data 57 as corresponding to the game apparatuses are excluded. Only the remaining parts may be displayed, or the remaining parts and the parts which have already been selected may be distinguishably displayed, for example, in different colors. Alternatively, the parts which have already been selected may also be selectable.

Next in step S23, the CPU core 21 determines whether or not data representing the selected part (selected part data) has been received by the wireless communication section 37 from the other game apparatuses. When each of other game apparatuses has selected a part, that game apparatus transmits the selected part data. In step S23, the CPU core 21 determines whether or not the selected part data has been transmitted by such a game apparatus. When the determination result in step S23 is positive, processing in step S24 is executed. When the determination result in step S23 is negative, processing in step S25 is executed.

In step S24, the CPU core 21 assigns the part selected by each of the other game apparatuses to that game apparatus. Namely, the game apparatus which transmitted the selected part data in step S23 is assigned the part indicated by the selected part data. In this embodiment, data representing the difficulty level (difficulty level data) is transmitted together with the selected part data. Therefore, the CPU core 21 updates the part data 57 so as to include the correspondence among the game apparatus which transmitted the selected part data in step S23, the part indicated by the selected part data, and the difficulty level indicated by the difficulty level data transmitted together with the selected part data. After step S24, processing is returned to step S21.

In step S25, the CPU core 21 determines whether or not the part has been selected for the own game apparatus. Specifically, it is determined whether or not an operation of selecting one of the parts displayed in step S22 has been performed based on the input made on the operation switch section 14 or the touch panel 15. When the determination result in step S25 is positive, processing in step S26 is executed. When the determination result in step S25 is negative, processing is returned to step S21.

In step S26, the CPU core 21 assigns the part selected in step S25 to the own game apparatus. The CPU core 21 accepts an operation by the player of instructing the difficulty level of the game operation, and determines the difficulty level in accordance with the instruction of the player. Then, the CPU core 21 updates the part data 57 so as to include the correspondence among the own game apparatus, the part selected in step S25, and the determined difficulty level.

Next in step S27, the CPU core 21 transmits the selected part data representing the part assigned in step S26 to all the other game apparatuses in the group by referring to the group data 58. Together with the selected part data, the CPU core 21 transmits the difficulty level data representing the difficulty level determined in step S26 and data for identifying the own game apparatus to the other game apparatuses. After step S27, the processing is returned to step S21.

As described above in steps S21 through S27, in this embodiment, the game apparatuses included in the group each select the part on a first-come-first-served basis, and thus the part assigned to each game apparatus is determined. In another embodiment, the part assigned to each apparatus may be randomly determined. Alternatively, the order of the players to select his/her part may be randomly determined.

Returning to FIG. 8, in step S5 after step S4, rehearsal play processing is executed. The rehearsal play processing is processing of causing the player to perform a first play (rehearsal play). Hereinafter, with reference to FIG. 11, the rehearsal play processing will be described in detail.

Figure 11:
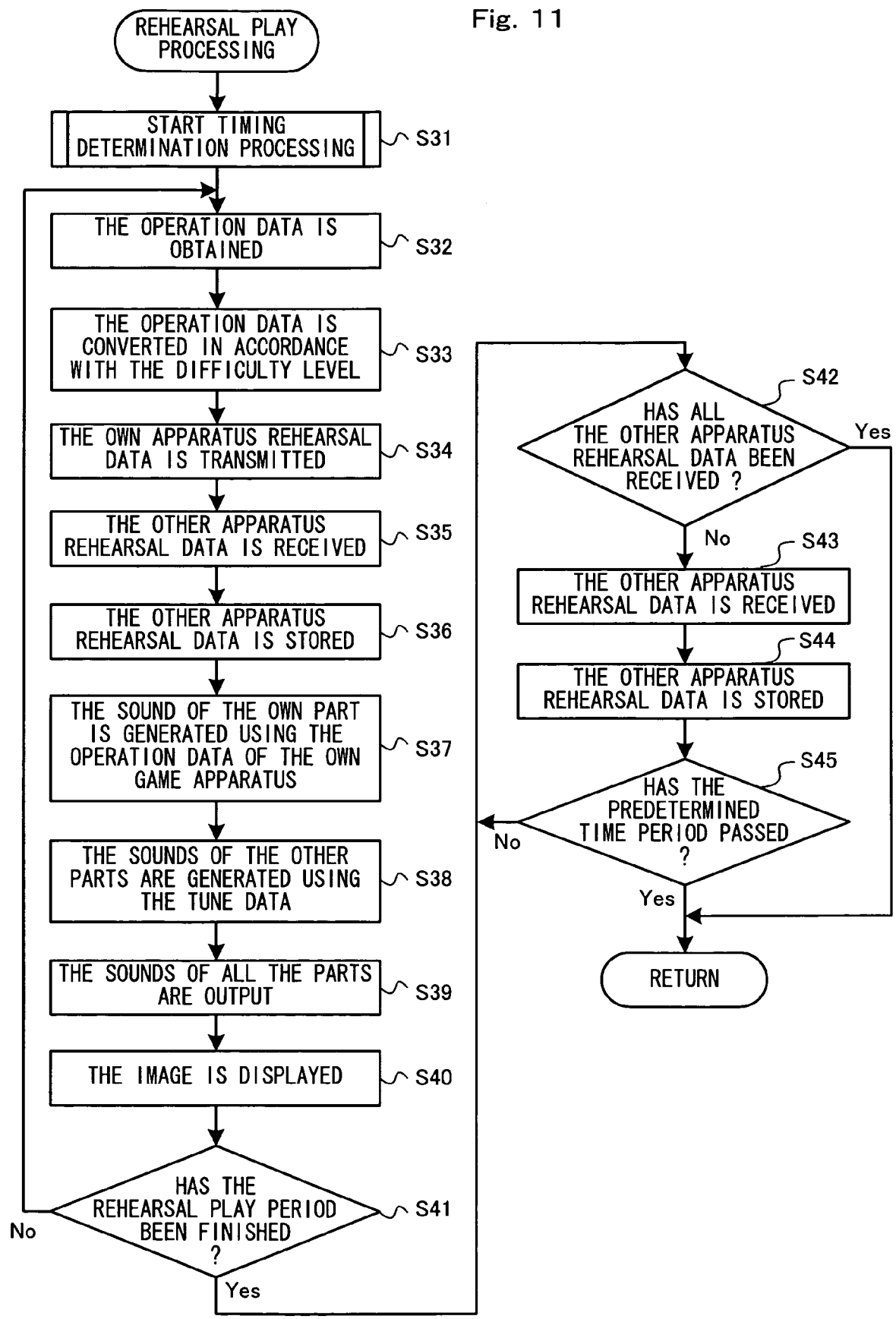
FIG. 11 is a flowchart illustrating rehearsal play processing (step S5) shown in FIG. 8 in detail.

FIG. 11 is a flowchart illustrating the rehearsal play processing (step S5) shown in FIG. 8 in detail. The rehearsal play processing is executed as follows. In step S31, the CPU core 21 executes start timing determination processing. The start timing determination processing is processing of determining the timing to start the play period. The "play period" is a time period in which the player can perform the play, namely, a time period in which the game apparatus accepts a play operation by the player. Hereinafter, with reference to FIG. 12, the start timing determination processing will be described in detail.

Figure 12:
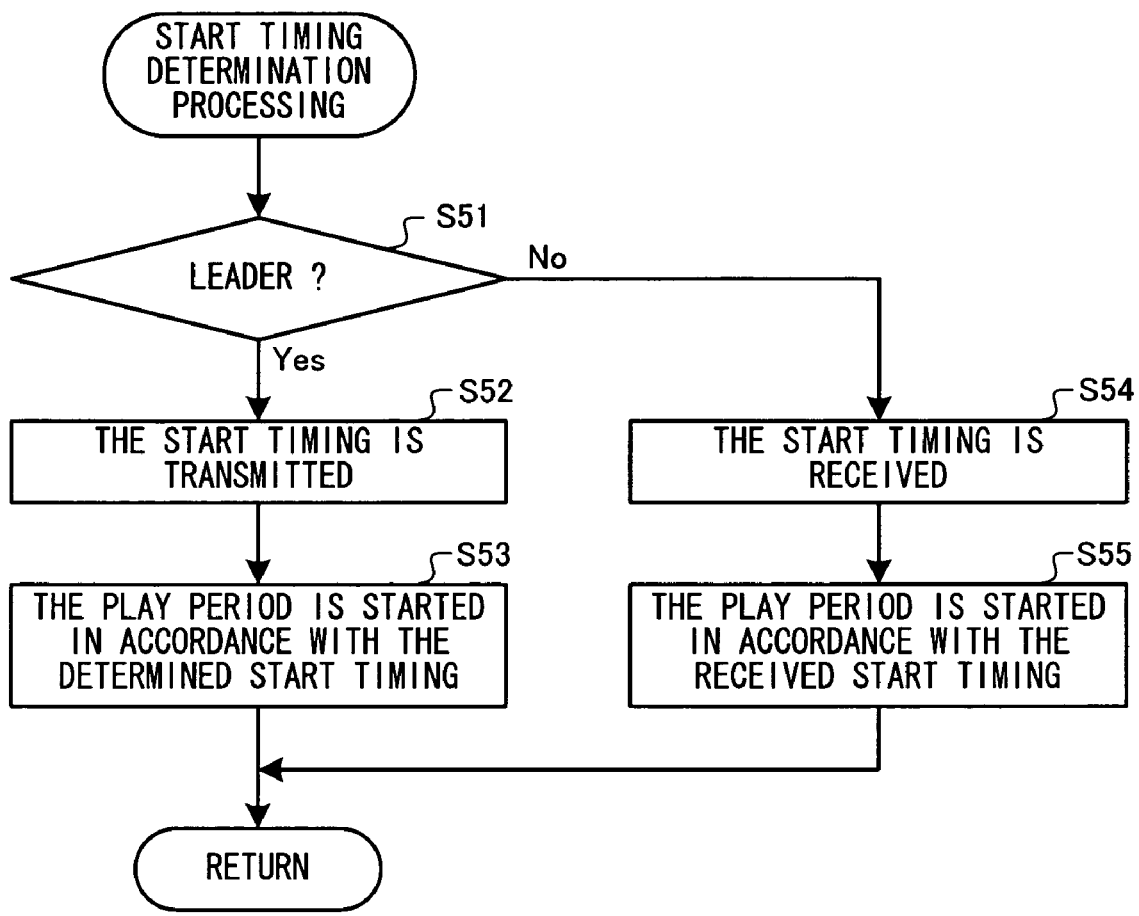
FIG. 12 is a flowchart illustrating start timing determination processing (step S31) shown in FIG. 11 in detail.

FIG. 12 is a flowchart illustrating the start timing determination processing (step S31) shown in FIG. 11 in detail. The start timing determination processing is executed as follows. In step S51, the CPU core 21 determines whether or not the own game apparatus is set as the leader. When the determination result in step S51 is positive, processing in step S52 is executed. When the determination result in step S51 is negative, processing in step S54 is executed.

In the leader game apparatus, processing in steps S52 and S53 is executed. In step S52, the CPU core 21 determines the timing to start the rehearsal play period, and transmits data representing such timing to the other game apparatuses. The data may represent the time period until the rehearsal play period starts, may represent the time at which the rehearsal play period starts, or may instruct to start the rehearsal play immediately. The timing to transmit the data to the other game apparatuses may be determined in consideration of the delay occurring when the leader game apparatus transmits the data to the other game apparatuses. At this point, the leader game apparatus may transmit data including different contents to different game apparatuses, such that the other game apparatuses can receive the data substantially at the same time, in consideration of the calculated delay time.

Next in step S53, the CPU core 21 starts the rehearsal play in accordance with the timing determined in step S52. Namely, the CPU core 21 starts a processing loop of steps S32 through S41 (FIG. 11) described later. After step S53, the CPU core 21 terminates the start timing determination processing shown in FIG. 12.

In a non-leader game apparatus, processing in steps S54 and S55 is executed. In step S54, the CPU core 21 receives the data representing the timing to start the rehearsal play period from the leader game apparatus. Next in step S55, the CPU core 21 starts the rehearsal play in accordance with the timing indicated by the data received in step S54. After step S54, the CPU core 21 terminates the start timing determination processing shown in FIG. 12.

By the start timing determination processing described above, the timing to start the play period is substantially synchronized among the game apparatuses. The game apparatuses start the rehearsal play at substantially the same timing and finish the rehearsal play at substantially the same timing. This prevents the situation that a certain game apparatus cannot start the play for real because the rehearsal play has not been finished in the other game apparatuses. Namely, a player who has finished the rehearsal play can start the play for real without waiting for the other players to finish the rehearsal play for a long time. The start timing determination processing is executed for the purpose of reducing the time period in which the players need to wait to start the play for real. Therefore, the start timing does not need to be exactly the same, and there may be a delay of about several seconds, among the game apparatuses.

Returning to FIG. 11, after the start timing determination processing in step S31, the processing loop of steps S32 through S41 is executed. The processing loop is executed for each frame time.

In step S32, the CPU core 21 obtains operation data representing the operation performed on the play buttons of the own game apparatus from the operation switch section 14. The operation data includes data indicating whether each play button has been pressed or not.

Next in step S33, the CPU core 21 executes predetermined conversion of the operation data obtained in step S32 in accordance with the difficulty level which is set for the own game apparatus. Specifically, when the difficulty level is set to level 1 or level 2, the operation data is converted to the contents in the case where the difficult level is level 3. More specifically, the types of the play buttons indicated by the operation data as having been pressed are changed based on the tune data 56. When the difficulty level is set to level 1 and if the operation data indicates that any of the play buttons has been pressed, the operation data is changed so as to indicate that the play button to be pressed at the current timing is pressed. The "play button to be pressed" can be specified by referring to the tune data 56. When the difficulty level is set to level 2, the following processing is executed, for example. At a timing when the L button or the R button and a certain button (for example, one of the buttons of the cross-shaped key) should be pressed simultaneously, if the operation data indicates that the certain button is pressed, the operation data is changed so as to indicate that the certain button is pressed simultaneously with the L button or the R button. Whether or not it is the timing to press the L button or the R button can be determined by referring to the tune data 56. Namely, in step S33, in the case where the low difficulty level is set for the own game apparatus, the CPU core 21 compares the operation data obtained in step S32 and the play operation instruction data included in the tune data 56, determines that at least the timing indicated by the operation data is in the tolerable range with respect to the timing indicated by the play operation instruction data, and converts the operation data obtained in step S32 into the play operation instruction data defined by the tune data 56. The CPU core 21 may also determine whether or not the types of operations (for example, the pressed buttons) indicated by the operation data obtained in step S32 and the play operation instruction data defined by the tune data 56 have a predetermined relationship. The determination result on the predetermined relationship may be changed in accordance with the difficulty level. Specifically, the CPU core 21 may request the types of operations to be matched more strictly as the difficulty level is higher and tolerate the difference more as the difficulty level is lower.

As the rehearsal data, operation correct/incorrect data (data indicating whether a correct operation has been performed or not, which is obtained in each game apparatus by comparing the operation data and the play operation instruction data) may be transmitted to the other game apparatuses, instead of the operation data. The game apparatus on the receiving side may convert the received rehearsal data (operation correct/incorrect data) into the correct operation data based on the play operation instruction data.

Even in the case where the difficulty level is set to lever 1 or 2, if the operation data indicates that no play button has been pressed, the operation data is not changed.

Next in step S34, the CPU core 21 generates the own apparatus rehearsal data of the own game apparatus using the operation data after the processing in step S33, and transmits the own apparatus rehearsal data to the other game apparatuses registered in the group data 58 via the wireless communication section 37. The own apparatus rehearsal data 52 includes the operation data after the processing in step S33, frame number data representing the time at which the operation data was obtained, and the data identifying the own game apparatus. The frame number is, for example, 1 at the start of the rehearsal play period, and then is incremented by each frame. By the processing in step S34 being executed in each frame, the rehearsal data 52 is transmitted from each game apparatus to the other game apparatuses sequentially, i.e., in each frame. In order to guarantee that a play data transmitted from one game apparatus to the other game apparatuses is received by the game apparatuses on the receiving side, each game apparatus on the receiving side may transmit a notice confirming the receipt of the play data to the game apparatus on the transmission side. If the notice is not received by the game apparatus on the transmission side within a predetermined time period after the transmission of the play data, the game apparatus on the transmission side may re-transmit the play data. The own apparatus rehearsal data 52 generated as described above is stored on the RAM 24.

In this embodiment, the game apparatus 10 sequentially transmits the own apparatus rehearsal data 52 during the rehearsal play period. In another embodiment, the game apparatus 10 may sequentially store the own apparatus rehearsal data 52 on the RAM 24 during the rehearsal play period. After the rehearsal play period (but before the play-for-real period), the game apparatus 10 may transmit all the own apparatus rehearsal data 52 stored on the RAM 24 to the other game apparatuses.

Next in step S35, the CPU core 21 receives, by the wireless communication section 37, the rehearsal data (other apparatus rehearsal data) transmitted from the other game apparatuses registered in the group data 58. Since the communication state among the game apparatuses is not constant, the other apparatus rehearsal data may not be received in the processing loop of steps S32 through S41 in one frame and may be received a plurality of times in the processing loop of steps S32 through S41 in another frame.

Next in step S36, the CPU core 21 stores the rehearsal data after the processing in step S35 as the other apparatus rehearsal data 53 on the RAM 24 for each game apparatus. The other apparatus rehearsal data 53 stored on the RAM 24 is used for generating the play sounds of the other parts during the play for real described later.

After step S36, in steps S37 through S39, the play sounds of the own part and other parts are generated and output. In step S37, the CPU core 21 generates the play sound of the own part using the operation data after the processing in step S33. Specifically, the CPU core 21 determines the play button pressed in the current frame by the player based on the operation data, and determines the tone step to be output based on the type of the pressed play button and the difficulty level set for the own game apparatus. More specifically, the CPU core 21 refers to the part data 57 to determine the own part, and uses the sound data corresponding to such a part. For example, when the own part is guitar, the sound data of guitar is used. When the own part is piano, the sound data of piano is used. When the sound for each part is changed in accordance with the tune (or the portion of the tune), or when the sound to be output in response to the operation on the button is changed in accordance with the tune (or the portion of the tune), the sound data associated with the own part in the tune data 56 of the tune designated by the play tune designation data 59 is used. In the case where when the player performs a correct operation, the corresponding sound is to be output, namely, when the player performs a certain operation at the correct timing based on the play operation instruction (on the correct button), the corresponding sound is to be output, it is determined whether or not the operation data indicates that the operation has been performed at the correct timing (on the correct button) based on the play operation instruction data regarding the own part included in the tune data 56 of the tune designated by the play tune designation data 59. Only when the determination result is positive, the corresponding sound is output.

Next in step S38, the CPU core 21 generates the play sounds of the other parts using the tune data 56, Specifically, the CPU core 21 refers to the tune data 56 to specify the sounds to be output in the current frame, and sets the specified sounds as the play sounds of the other parts. Thus, the sound of the own part generated in step S37 and the sounds of the other parts generated in step S38 can be synchronized with each other.

Next in step S39, the CPU core 21 outputs the play sound of the own part generated in step S37 and the play sounds of the other parts generated in step S38 via the speakers 30a and 30b. Namely, the CPU core 21 outputs the play sound of the own part in accordance with the play operation by the player while outputting the play sounds of the other parts generated using the tune data 56. By steps S37 through S39, the play sounds of the parts of the play tune are output as an ensemble. In step S39, a play sound acting as background music of the tune may be output based on the audio file data of the background music included in the tune data 56, so that the play sound of the own part, the play sounds of the other parts, and the background music are output as being synthesized.

Next in step S40, the CPU core 21 refers to the tune data 56 designated by the play tune designation data 59 to cause the first LCD 11 or the second LCD 12 to display a game image (FIG. 4) representing the play operation instruction on the own part registered in the part data 57. The game image can be generated based on the tune data 56.

In step S41, the CPU core 21 determines whether or not the rehearsal play period has been finished. The length of the play period is determined by the length of the play tune. Therefore, the determination in step S41 can be made based on the length of the play tune, by referring to the tune data 56. When the determination result in step S41 is positive, processing in step S42 is executed. When the determination result in step S41 is negative, processing is returned to step S32 and the processing loop of steps S32 through 41 is repeated until the rehearsal play period is finished.

As described above, there occurs a delay in the communication among the game apparatuses. Therefore, when the rehearsal play period is finished, the game apparatus has not necessarily received all the rehearsal data transmitted from the other game apparatuses. In this embodiment, by processing in steps S42 through S45, the game apparatus receives the rehearsal data which has not been received when the rehearsal play period is finished.

In step S42, the CPU core 21 determines whether or not all the other apparatus rehearsal data has been received. The expression that "all the other apparatus rehearsal data has been received" means that the rehearsal data on the entirety of the play period has been received from all the other game apparatuses in the group. The determination in step S42 can be made by referring to the other apparatus rehearsal data 53 stored on the RAM 24. When the determination result in step S42 is positive, the CPU core 21 terminates the rehearsal play processing shown in FIG. 11. When the determination result in step S42 is negative, processing in step S43 is executed.

In step S43, the CPU core 21 receives the other apparatus rehearsal data by substantially the same processing as step S35. Next in step S44, the CPU core 21 stores the rehearsal data received in step S43 as the other apparatus rehearsal data 53 on the RAM 24 by substantially the same processing as step S36. After step S44, processing in step S45 is executed.

In step S45, the CPU core 21 determines whether or not a predetermined time period has passed since the rehearsal play processing was finished. If the predetermined time period is set to be too long, the time period after the rehearsal play period is finished until the play-for-real period is started becomes too long, which means the player needs to wait for too long. Therefore, the predetermined time period may be sufficiently long for one game apparatus to transmit rehearsal data to the other game apparatuses, and does not need to be set longer. When the determination result in step S45 is positive, the CPU core 21 terminates the rehearsal play processing shown in FIG. 11. When the determination result in step S45 is negative, the processing is returned to step S42. The rehearsal play processing is executed in this manner.

Returning to FIG. 8, in step S6 after step S5, play-for-real processing is executed. The play-for-real processing is processing of causing the player to perform a second play (play for real). Hereinafter, with reference to FIG. 13, the play-for-real processing will be described in detail.

Figure 13:
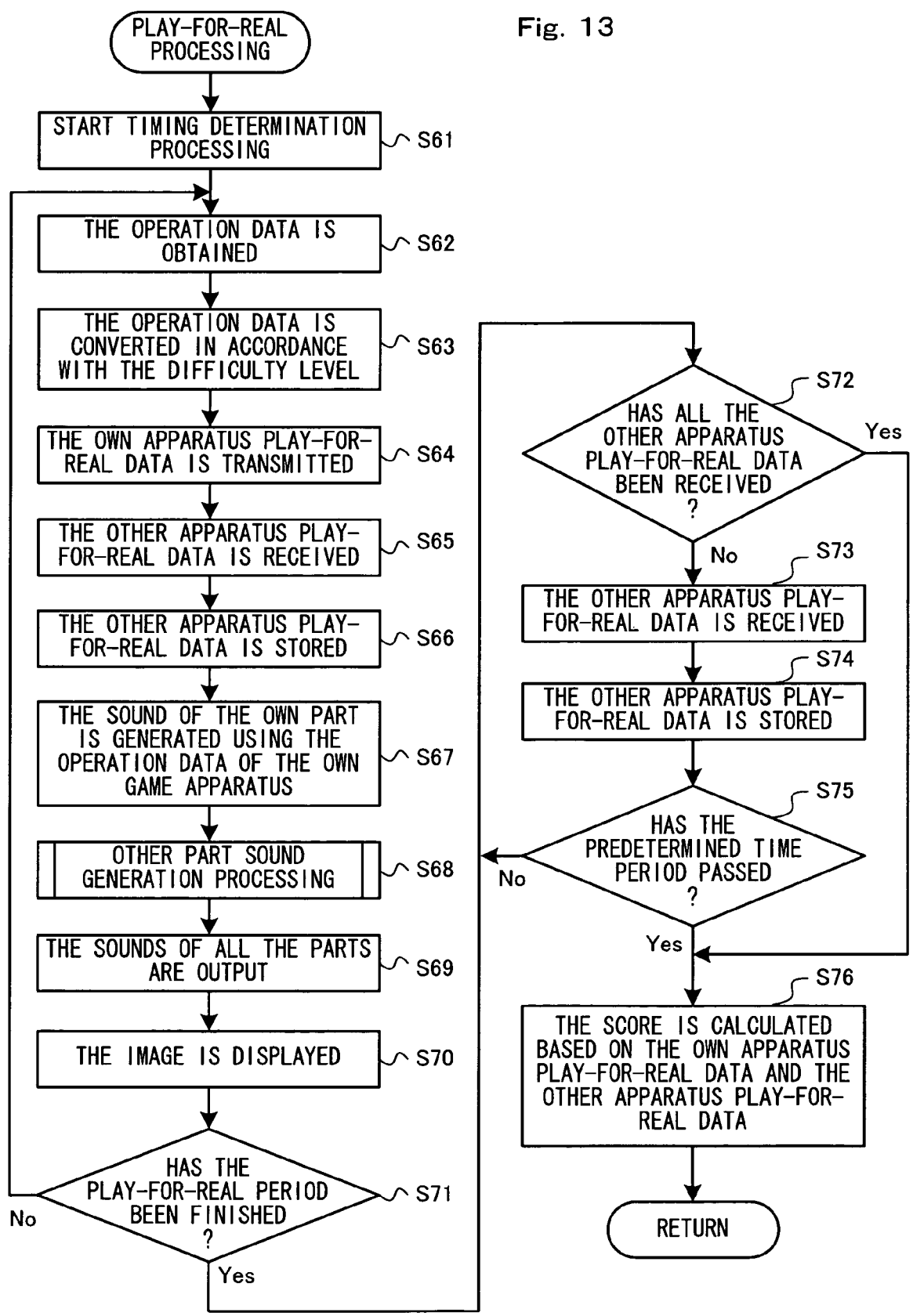
FIG. 13 is a flowchart illustrating play-for-real processing (step S6) shown in FIG. 8 in detail.

FIG. 13 is a flowchart illustrating the play-for-real processing (step S6) shown in FIG. 8 in detail. The play-for-real is executed as follows. In step S61, the CPU core 21 executes start timing determination processing. The start timing determination processing is the same as the processing in step S31 (see FIG. 12).

Owing to the start timing determination processing in step S61, the game apparatuses start the play for real at substantially the same timing and finish the play for real at substantially the same timing. In this embodiment, after the play for real, a score is calculated reflecting the play by each game apparatus (step S75 described later). Since the play for real is finished in the game apparatuses substantially at the same timing by the processing in step S61, the game apparatuses can each calculate the score after finishing the play for real, without waiting for a long time for the other game apparatuses to finish the play for real. Namely, the players can each check the evaluation (score) of the play after finishing the play for real without waiting for too long. As in step S31, the start timing does not need to be exactly the same, and there may be a delay of, for example, about several seconds, among the game apparatuses.

After step S61, a processing loop of steps S62 through S71 is executed. The processing loop is executed for each frame time.

In step S62, the CPU core 21 obtains operation data representing the operation performed on the play buttons of the own game apparatus from the operation switch section 14. Next in step S63, the CPU core 21 executes predetermined conversion of the operation data obtained in step S62 in accordance with the difficulty level set for the own game apparatus. The processing in steps S62 and S63 is the same as that in steps S32 and S33. Next in step S64, the CPU core 21 generates the own apparatus play-for-real data of the own game apparatus using the operation data after the processing in step S63, and transmits the own apparatus play-for-real data to the other game apparatuses via the wireless communication section 37. The method for generating the own apparatus play-for-real data is the same as the method for generating the own apparatus rehearsal data in step S34. The generated own apparatus play-for-real data 54 is stored on the RAM 24.

Next in step S65, the CPU core 21 receives, by the wireless communication section 37, the play-for-real data (other apparatus play-for-real data) transmitted from the other game apparatuses. As in the case of the rehearsal play processing, the other apparatus play-for-real data may not be received in the processing loop of steps S62 through S71 in one frame. Next in step S66, the CPU core 21 stores the play-for-real data received in step S65 as the other apparatus play-for-real data 55 on the RAM 24. The other apparatus play-for-real data 55 stored on the RAM 24 is used for calculating a score in step S76 as described later.

Next in step S67, the CPU core 21 generates the play sound of the own part using the operation data after the processing in step S63. The processing in step S67 is the same that in step S37.

Next in step S68, the CPU core 21 executes other part sound generation processing. The other part sound generation processing is processing of generating the sounds of the other parts to be output during the play for real, using the other apparatus rehearsal data 53. Hereinafter, with reference to FIG. 14, the other part sound generation processing will be described in detail.

Figure 14:
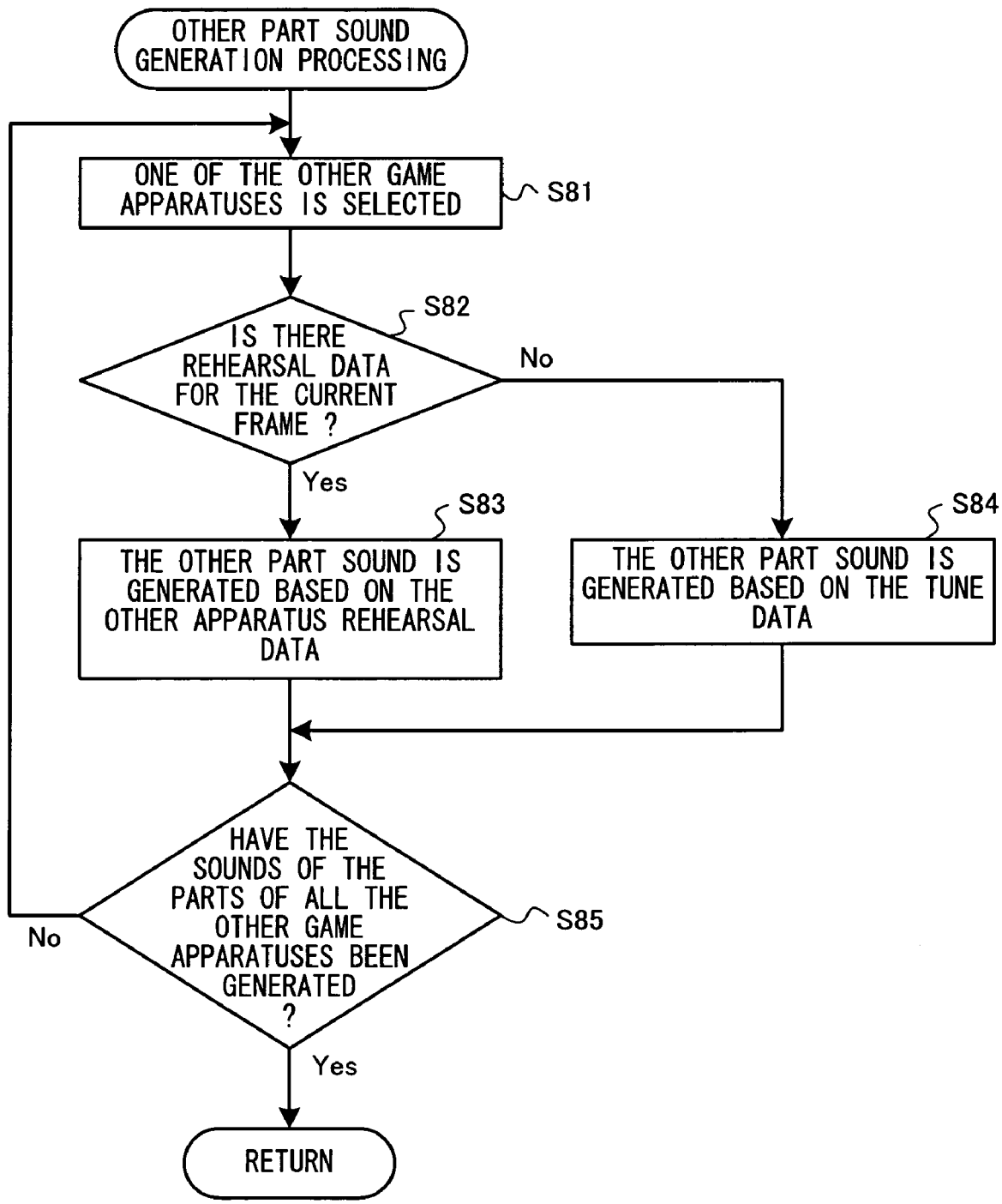
FIG. 14 is a flowchart illustrating other part sound generation processing (step S68) shown in FIG. 13 in detail.

FIG. 14 is a flowchart illustrating the other part sound generation processing (step S68) shown in FIG. 13 in detail. The other part sound generation processing is executed for each of the game apparatuses registered in the group data 58. The other part sound generation processing is executed as follows. In step S81, the CPU core 21 selects one of the other game apparatuses in the group. In one cycle of the other part sound generation processing, one game apparatus other than the game apparatuses already selected is selected. In processing of steps S82 through S84, the sound of the part corresponding to the game apparatus selected in step S81 is generated.

In step S82, the CPU core 21 determines whether or not the other apparatus rehearsal data (the rehearsal data transmitted from the game apparatus selected in step S81) for the current frame is stored on the RAM 24. In the case where the communication with the other game apparatus is interrupted during the rehearsal play, for example, in the case where the play game is stopped in the middle in the other game apparatus, or the power of the other game apparatus is turned off, the rehearsal data from the other game apparatus is not received after such an incident. As a result, the rehearsal data of the entirety of the play of the other game apparatus is not necessarily stored on the RAM 24. Accordingly, in the case where the communication with the other game apparatus is interrupted, the determination result in step S82 is negative. In this case, processing in step S84 is executed. In the case where the communication with the other game apparatus is normally performed, the determination result in step S82 is positive. In this case, processing in step S83 is executed.

In step S83, the CPU core 21 generates the sound of the other part assigned to the other game apparatus selected in step S81 using the other apparatus rehearsal data 53. The other apparatus rehearsal data 53 is stored on the RAM 24 in step S36 of the rehearsal play processing described above. The method for generating the play sound of the other part using the other apparatus rehearsal data 53 is substantially the same as the method for generating the play sound of the operation data of the own game apparatus. It should be noted that for generating the play sound of the other part using the other apparatus rehearsal data 53 received from the other game apparatus, the CPU core 21 refers to the part data 57 to determine the part of the other game apparatus, and outputs the sound based on the other apparatus rehearsal data 53 using the sound data corresponding to that part. Namely, when the part of the other game apparatus is, for example, guitar, the sound data for guitar is used. When the part of the other game apparatus is piano, the sound data for piano is used. When the sound for each part is changed in accordance with the tune (or the portion of the tune), or when the sound to be output in response to the operation on the button is changed in accordance with the tune (or the portion of the tune), the sound data associated with the part or the other game apparatus in the tune data 56 of the tune designated by the play tune designation data 59 is used. In the case where when the player performs a correct, the corresponding sound is to be output, it is determined whether or not the operation data indicates that the operation has been performed at the correct timing (on the correct button) based on the play operation instruction data regarding the part of the other game apparatus. Only when the determination result is positive, the corresponding sound is output.

On the other hand, in step S84, the CPU core 21 generates the play sound of the other game apparatus using the tune data 56. The processing in step S84 is the same as that in step S38.

As described above regarding steps S82 through S84, in this embodiment, during the play-for-real period, the game apparatus 10 determines whether or not it is possible to generate the sound of the other part for each portion of the play tune using the other apparatus rehearsal data 53 stored on the RAM 24 (step S82). In the case where the determination result is negative on a certain part, the CPU core 21 automatically generates the play sound using the tune data 56 for the portion of the tune for which the play sound cannot be generated using the other apparatus rehearsal data 53 (step S84). Namely, in this embodiment, in the case where the rehearsal data is not obtained from the other game apparatus at the time of the play for real, the play sound is generated using the tune data 56 prepared in advance. Therefore, if the communication with the other game apparatus is interrupted for some reason, the situation does not occur that the sound of the other part is not generated and thus is not output during the play for real. If it is intended to clearly show that such an interruption occurred, the sound of the part, the data on which is not obtained, may not be provided.

After step S83 or S84, processing in step S85 is executed. In step S85, the CPU core 21 determines whether or not the play sounds of the parts corresponding to all the other game apparatuses in the group have been generated. When the determination result in step S85 is positive, the CPU core 21 terminates the other part sound generation processing shown in FIG. 14. When the determination result in step S85 is negative, the processing is returned to step S81.

Returning to FIG. 13, in step S69 after step S68, the CPU core 21 outputs the play sound of the own part generated in step S67 and the play sounds of the other parts generated in step S68 via the speakers 30a and 30b. In more detail, the CPU core 21 outputs the play sounds of the other parts using the other apparatus rehearsal data 53 stored on the RAM 24 while outputting the play sound of the own part in accordance with the play operation by the player. Thus, the sounds of the parts of the play tune are output as an ensemble. In the case where the number of the game apparatuses included in the group is smaller than the number of the parts forming the play tune, there is at least one part which is not played by any player. The sound of such a part is generated using the tune data 56 and output via the speakers 30a and 30b. In step S69, a play sound acting as background music of the tune may be output based on the audio file data on the background music included in the tune data 56, so that the play sound of the own part, the play sounds of the other parts, and the background music are output as being synthesized.

Figure 4:
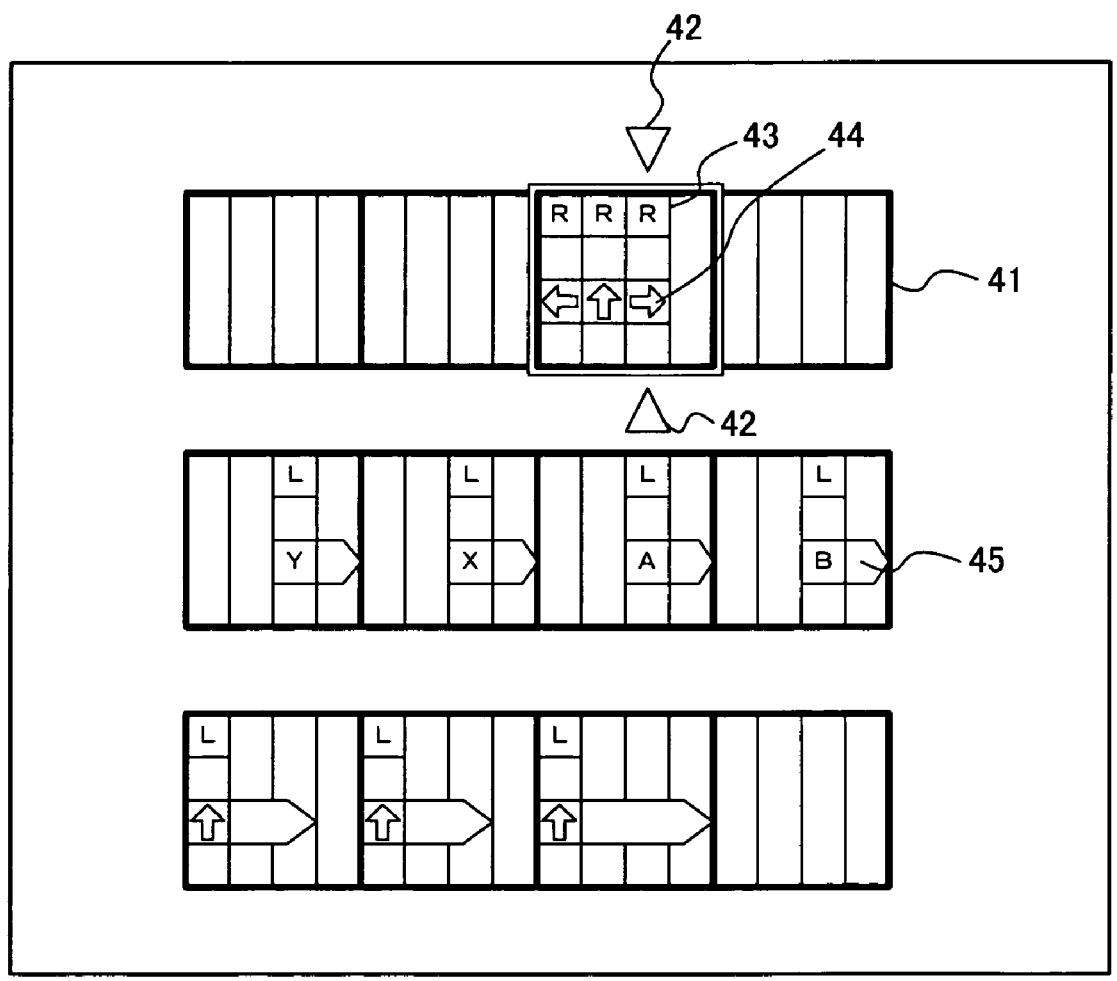
FIG. 4 shows an exemplary game image displayed on a screen of the game apparatus 10.

Next in step S70, the CPU core 21 causes the first LCD 11 or the second LCD 12 to display a game image (FIG. 4)

representing the play operation instruction on the own part of the play tune by substantially the same processing as that in step S40.

In step S71, the CPU core 21 determines whether or not the play-for-real period has been finished by substantially the same processing as that in step S41. When the determination result in step S71 is positive, processing in step S72 is executed. When the determination result in step S71 is negative, processing is returned to step S62 and the processing loop of steps S62 through 71 is repeated until the play-for-real period is finished.

By processing in steps S72 through S75 described below, the game apparatus receives the play-for-real data which has not been received when the play-for-real period is finished due to the delay in data transfer among the game apparatuses. In step S72, the CPU core 21 determines whether or not all the other apparatus play-for-real data has been received by substantially the same processing as that in step S42. When the determination result in step S72 is positive, the CPU core 21 terminates the play-for-real processing shown in FIG. 14. When the determination result in step S72 is negative, processing in step S73 is executed.

In step S73, the CPU core 21 receives the other apparatus play-for-real data by substantially the same processing as step S65. Next in step S74, the CPU core 21 stores the play-for-real data received in step S73 on the RAM 24 by substantially the same processing as step S66. After step S74, processing in step S75 is executed.

In step S75, the CPU core 21 determines whether or not a predetermined time period has passed since the play-for-real processing was finished. Like for step S45, the predetermined time period for step S75 may be sufficiently long for one game apparatus to transmit play-for-real data to the other game apparatuses, and does not need to be set longer. When the determination result in step S75 is positive, the CPU core 21 terminates the play-for-real processing shown in FIG. 14. When the determination result in step S45 is negative, the processing is returned to step S72.

In step S76, the CPU core 21 calculates a score based on the own apparatus play-for-real data 54 and the other apparatus play-for-real data 55 stored on the RAM 24. The score is calculated, for example, as follows. A similarity degree between the play-for-real data and the tune data of each part is calculated, and the score is higher as the similarity degree is higher. Alternatively, in the case where a plurality of parts should output a sound at the same timing, the score may be set to be higher as the timing to output the sound is matched among the plurality of parts at a higher degree. The entire score may be calculated as follows, for example. The score of the own game apparatus is calculated based on the similarity degree between the own apparatus play-for-real data 54 and the tune data 56 for the own part, a score of each of the other game apparatuses is calculated based on the similarity degree between the other apparatus play-for-real data 55 and the tune data 56 for the corresponding part, and the entire score is calculated by summing or averaging (or weighted-averaging) those calculated scores. The entire score may be calculated by comparing the own apparatus play-for-real data 54 and the other apparatus play-for-real data 55 (for example, by checking if, at the play operating timing common to the parts, the game apparatuses were operated at the same timing).

In this embodiment, the score may be calculated based on the own apparatus rehearsal data 52 and the other apparatus rehearsal data 53 in addition to the play-for-real data. In this case, for example, a score based on the play-for-real data and a score based on the rehearsal data may be each calculated, and the entire score may be obtained by a predetermined calculation (summing, averaging, weighted-averaging, etc.) based on these scores. An improvement degree may be calculated by comparing the rehearsal data and the play-for-real data of each game apparatus and used as the score.

When the communication with the other game apparatus is interrupted during the play-for-real period, the play-for-real data is not received from the other game apparatus after that. In this case, the CPU core 21 calculates the score based on the play-for-real data of only the game apparatuses other than such a game apparatus.

Regarding the scoring, the play-for-real data may not be transmitted or received during the play for real. The score calculated on the own game apparatus after the play for real may be transmitted to one another. In this case, the processing in steps S64 through S66 is not necessary.

The score calculated as described above is displayed by the first LCD 11 or the second LCD 12. Thus, the players can learn the evaluation on each player of the play performed in the play-for-real period. The play-for-real processing shown in FIG. 13 is executed in this manner.

In another embodiment, the CPU core 21 may further execute processing of storing the own apparatus play-for-real data 54 on the RAM 24 during the play-for-real processing, and generate and output the sounds of the own part and the other parts based on the own apparatus play-for-real data and the other apparatus play-for-real data by substantially the same processing as that in step S68. In this case, an ensemble using the play-for-real data of all the parts can be reproduced by, for example, replay.

Returning to FIG. 8, in step S7 after step S6, the CPU core 21 determines whether or not to terminate the game. The determination in step S7 is made depending on, for example, whether or not there is an instruction from the player to terminate the game, or whether or not the ensemble has been performed a predetermined number of times. When the determination result in step S7 is negative, the processing is returned to step S3. At this point, the leader game apparatus may be changed. For example, the leader game apparatus may select the next leader game apparatus among the other game apparatuses. When the determination result in step S7 is positive, the CPU core 21 terminates the game processing shown in FIG. 8.

As described above, according to this embodiment, the game apparatus causes the player to play twice, i.e., a rehearsal play and a play for real. Thus, each game apparatus can output, at the time of the play for real, the rehearsal play results of the other game apparatuses. As a result, an ensemble can be provided without the sounds of the other parts being delayed from the sound of the own part or without spoiling the responsiveness to the play operation. Therefore, according to this embodiment, the player can enjoy the ensemble game with the players at far locations without being disturbed by the influence of the communication.

In the above embodiment, the game apparatus causes the player to play twice. In another embodiment, the game apparatus may cause the player to play there or more times. In such a case, a sound of another part in the n'th play (n is a natural number of 2 or greater) may be generated using the play data at the (n−1)th play and output.

In the above embodiment, the play operation for performing the play is the operation of pressing an appropriate play button at an appropriate timing. The play operation may be in any format. For example, when the touch panel 15 of the game apparatus 10 is used as an input device, the image of a guitar or a piano may be displayed by the second LCD 12, and the operation of performing a touch input on the screen of the second LCD 12 may be used as the play operation. Specifically, when an image of strings of the guitar is displayed, the game apparatus 10 may calculate the direction and the strength for picking a string based on the input on the tough panel 15, and output the sound of the guitar based on the direction and the strength. In addition, data representing the direction and the strength may be used as the play data (the rehearsal data or the play-for-real data).

In the above embodiment, an ensemble game played by a plurality of players is described. The present invention is applicable to any game played by a plurality of players using a plurality of game apparatuses. For example, the present invention is applicable to a game in which an operation button is pressed at an appropriate timing to cause a character displayed on the screen of the display device to dance to a tune. In such a game, a plurality of characters appear which are operated by the game apparatuses respectively. Each game apparatus displays a motion (dance) of the plurality of characters performed in accordance with the operation by the players. In a game system for performing such a game, like in the ensemble game, each game apparatus sets two operation periods in which an operation for causing the character to dance to a tune is accepted. In a first operation period, each game apparatus transmits motion data for specifying a motion content of its own operation target (character), to the other game apparatuses, instead of the play data. The motion data is, for example, operation data representing the operation by the player. In a second operation period, each game apparatus controls the motion of the other operation targets based on the motion data received from the other game apparatuses, while controlling the motion of its own operation target in accordance with the operation by the player. The motion of the plurality of operation targets is displayed on the screen. The present invention is applicable to such a dance game. The present invention is also applicable to, for example, a puzzle game in which a plurality of players compete.

The present invention has been made for, for example, improving the operability of a game played by a plurality of players via communication by eliminating a delay in the communication, and is applicable to, for example, an ensemble game in which a plurality of players play ensemble.

While the invention has been described in detail, the foregoing description is in all aspects illustrative and not restrictive. It is understood that numerous other modifications and variations can be devised without departing from the scope of the invention.

What is claimed is:

1. An ensemble game system, comprising a plurality of game apparatuses configured to communicate with each other and to allow players to respectively play a plurality of parts which form a tune using a respective game apparatus to execute an ensemble game, wherein:
each of the plurality of game apparatuses includes:
an input device;
a processor; and
a memory coupled to said processor, said memory storing instructions that, when executed by said processor, control said processor to:
output a sound of a first part in accordance with an input from the input device by the player during a first play period;
generate play reproduction data, which is play data for reproducing the first part during the first play period based on the input from the input device during the first play period, and transmit the play reproduction data to another game apparatus;
receive play reproduction data of a second part different than the first part from the another game apparatus and store the play reproduction data of the second part in the memory; and
output a sound of the second part using the play reproduction data stored in the memory during a second play period which is subsequent to the first play period, while outputting a sound of the first part in accordance with an input from the input device by the player during the second play period.

2. The ensemble game system according to claim 1, wherein:
the memory of each game apparatus has stored thereon tune data for specifying contents of the parts of the tune;
the processor of each game apparatus is further controlled to:
automatically output the sound of the second part using the tune data obtained during the first play period; and
output the sound of the first part in accordance with an input from the input device by the player in concert with the reproduced sound of the second part.

3. The ensemble game system according to claim 1, wherein the processor of at least one of the plurality of game apparatuses is further controlled to:
store a plurality of pieces of tune data, each for specifying contents of the parts forming a tune;
determine a tune to be played among the tunes, the tune data of which is stored in the memory; and
transmit the tune data of the determined tune to the another game apparatus,
wherein the remaining of the plurality of game apparatuses other than the at least one game apparatus receives the tune data transmitted from the at least one of the plurality of game apparatuses and executes the ensemble game using the tune data.

4. The ensemble game system according to claim 3, further comprising group determination circuitry configured to determine a group of game apparatuses to join the ensemble game among a plurality of game apparatuses executing the ensemble game.

5. The ensemble game system according to claim 1, wherein the processor of each game apparatus is further controlled to:
store instruction data for instructing an input by the input device for each part; and
instruct an input based on the instruction data on the first part.

6. The ensemble game system according to claim 1, wherein:
each game apparatus stores in the memory, for each part, corresponding sound data which is output in correspondence with an input by the input device; and
when outputting the sound of a first part and outputting the sound of the second part while outputting a sound of the first part reference is made to the corresponding sound data to output the sound of the first part in accordance with the input from the input device.

7. The ensemble game system according to claim 1, comprising group determination circuitry for determining a group of game apparatuses to join the ensemble game among a plurality of game apparatuses, wherein in each of the game apparatuses included in the group determined by the group determination circuitry, the processor is controlled to:
output the sound of the first part in accordance with an input from the input device by the player;

transmit the play reproduction data which is play data for reproducing the play of the first part during the first play period to another game apparatus in the group;

receive play reproduction data on another part different than the first part from the another game apparatus included in the group, and store the play reproduction data in the memory of the player's game apparatus; and output a sound of the another part using the play reproduction data on the another game apparatus in the group, the data being the stored in the memory, during the second play period subsequent to the first play period, while outputting the sound of the first part in accordance with an input from the input device by the player during the second play period.

8. The ensemble game system according to claim 1, further comprising part determination circuitry for determining a part for each game apparatus; wherein:

a sound of the part of the player's game apparatus determined by the part determination circuitry is output in accordance with an input from the input device; and the sound of the part of the player's game apparatus determined by the part determination circuitry is output in accordance with the input from the input device, while a sound of a part of the another game apparatus determined by the part determination circuitry is output using the play reproduction data on the another game apparatus.

9. The ensemble game system according to claim 1, wherein each game apparatus further comprises first timing determination circuitry for synchronizing a timing to start the first play period among the game apparatuses.

10. The ensemble game system according to claim 1, wherein:

the processor is controlled to sequentially transmit play reproduction data of the first part during the first play period; and the processor is controlled to sequentially receive the play reproduction data of the second part from the another game apparatus.

11. The ensemble game system according to claim 1, wherein:

to the memory of each game apparatus sequentially stores the play reproduction data of the own part; and after the first play period is finished, the play reproduction data of the first part stored in the memory is transmitted to the another game apparatus.

12. The ensemble game system according to claim 1, wherein the play reproduction data includes data representing a time point in the first or the second play period and operation data representing a play operation made by the player at the time point.

13. The ensemble game system according to claim 1, wherein the processor of each game apparatus is further controlled to:

transmit play result data for specifying a play result of the first part during the second play period to another game apparatus;

receive play result data for specifying a play result of the second part during the second play period from the another game apparatus; and evaluate a play result of the entirety of the plurality of parts based on the play result data for specifying the play result of the first part during the second play period and the received play result data received.

14. The ensemble game system according to claim 13, wherein each game apparatus is further controlled to synchronize a time to start the second play period among the game apparatuses.

15. The ensemble game system according to claim 1, wherein:

the memory of each game apparatus has stored thereon tune data for specifying contents of the parts of the tune;

each game apparatus is further controlled to determine, during the second play period, whether it is possible to generate a sound of the second part for each of portions of the tune using the play reproduction data of the another part stored in the memory; and when it is determined that it is not possible to generate the sound of the second part for each of the portions of the tune, the processor is controlled to generate, using the tune data, a sound of the portion of the tune, which was determined as not being able to be generated using the play reproduction data of the second part.

16. An ensemble game system, comprising a plurality of game apparatuses communicable to each other, the game system allowing players to respectively play a plurality of parts which form a tune using a respective game apparatus to execute an ensemble game, the game system comprising:

group determination circuitry configured to determine a group of game apparatuses to join the ensemble game among a plurality of game apparatuses; and part determination circuitry configured to determine a part of each game apparatus included in the group determined by the group determination circuitry, prior to start of the ensemble game;

wherein each game apparatus included in the group determined by the group determination circuitry comprises:

first play execution circuitry configured to instruct the player on an input of an own part determined by the part determination circuitry, while outputting a sound in accordance with an input from an input device by the player, during a first play period of the ensemble game;

automatic reproduction circuitry configured to automatically output a sound of a part other than the part determined by the part determination circuitry during the first play period of the ensemble game;

a play reproduction data transmitter configured to generate play reproduction data which is data for reproducing a sound output executed by the first play execution circuitry of the own game apparatus during the first play period, based on an input from the input device during the first play period, and to transmit the play reproduction data to another game apparatus included in the group;

a play reproduction data receiver configured to receive play reproduction data from the another game apparatus included in the group and to store the play reproduction data in the memory of the own game apparatus;

reproduction circuitry configured to, during a second play period in the ensemble game subsequent to the first play period, reproduce a sound output executed by the first play execution circuitry of the another game apparatus included in the group during the first play period, using the play reproduction data of the another game apparatus, the data being stored in the memory; and second play execution circuitry configured to instruct the player on an input of the own part determined by the part determination circuitry, while outputting a sound in accordance with an input from the input device by the player in concert with the sound output by the reproduction circuitry, during the second play period of the ensemble game.

17. An ensemble game system, comprising a plurality of game apparatuses communicable to each other and allowing players to play a tune using the plurality of game apparatuses to execute an ensemble game, wherein:
each of the plurality of game apparatuses includes:
an input device;
first play execution circuitry configured to output a sound of an own play in accordance with an input from the input device by the player during a first play period;
a play reproduction data transmitter configured to generate play reproduction data which is play data for reproducing the own play during the first play period based on the input from the input device during the first play period, and to transmit the play reproduction data to another game apparatus;
a play reproduction data receiver configured to receive play reproduction data transmitted from the another game apparatus and to store the play reproduction data in the memory of the own game apparatus; and
second play execution circuitry configured to output a sound of a play of the another game apparatus using the play reproduction data stored on the storage medium during a second play period subsequent to the first play period, while outputting a sound of the own play in accordance with an input from the input device by the player during the second play period.

18. A game apparatus included in an ensemble game system, comprising a plurality of game apparatuses communicable to each other and allowing players to respectively play a plurality of parts which form a tune using a respective game apparatus to execute an ensemble game, the game apparatus comprising:
an input device;
a processor;
a memory coupled to said processor, said memory storing instructions that, when executed by said processor, control said processor to:
output a sound of an own part in accordance with an input from the input device by the player during a first play period;
generate play reproduction data which is play data for reproducing a play of the own part during the first play period based on the input from the input device during the first play period, and transmit the play reproduction data to another game apparatus;
receive play reproduction data on another part other than the own part from the another game apparatus and store the play reproduction data on the memory of the own game apparatus; and
output a sound of the another part using the play reproduction data stored in the memory during a second play period subsequent to the first play period, while outputting a sound of the own part in accordance with an input from the input device by the player during the second play period.

19. The game apparatus according to claim 18, wherein:
the memory of the game apparatus has stored thereon tune data for specifying contents of the parts of the tune;
the game apparatus is further controlled to automatically output the sound of the another part using the tune data during the first play period; and
the game apparatus is further controlled to output the sound of the own part in accordance with an input from the input device by the player in concert with the sound of the reproduced another part.

20. A non-transitory computer-readable storage medium having stored thereon an ensemble game program executable by a computer of a game apparatus included in an ensemble game system, comprising a plurality of game apparatuses communicable to each other and allowing players to respectively play a plurality of parts which form a tune using a respective game apparatus to execute an ensemble game, the ensemble game program causing the computer to execute:
outputting a sound of an own part in accordance with an input from an input device by the player during a first play period;
generating play reproduction data which is play data for reproducing a play of the own part during the first play period based on the input from the input device during the first play period, and transmitting the play reproduction data to another game apparatus;
receiving play reproduction data on another part other than the own part from the another game apparatus and storing the play reproduction data on a memory of the own game apparatus; and
outputting a sound of the another part using the play reproduction data stored in the memory during a second play period subsequent to the first play period, while outputting a sound of the own part in accordance with an input from the input device by the player during the second play period.

21. The non-transitory storage medium according to claim 20, wherein:
the memory of the game apparatus has stored thereon tune data for specifying contents of the parts of the tune;
the ensemble game program causes the computer to automatically output the sound of the another part using the tune data during the first play period; and
when outputting a sound of the own part in accordance with the input from the input device by the player during the first play period, the sound of the own part is output in concert with the sound of the reproduced another part.

* * * * *